US007578737B2

(12) United States Patent
Cregan et al.

(10) Patent No.: US 7,578,737 B2
(45) **Date of Patent: *Aug. 25, 2009**

(54) GAMING DEVICE HAVING A MULTIPLE SYMBOL SWAPPING GAME

(75) Inventors: Karen M. Cregan, Reno, NV (US); Robert N. Silva, III, Reno, NV (US)

(73) Assignee: IGT, Reno, NV (US)

( * ) Notice: Subject to any disclaimer, the term of this patent is extended or adjusted under 35 U.S.C. 154(b) by 45 days.

This patent is subject to a terminal disclaimer.

(21) Appl. No.: 12/118,349

(22) Filed: May 9, 2008

(65) Prior Publication Data

US 2008/0214283 A1 Sep. 4, 2008

Related U.S. Application Data

(62) Division of application No. 10/657,578, filed on Sep. 8, 2003, now Pat. No. 7,371,170.

(51) Int. Cl.
*A63F 13/00* (2006.01)

(52) U.S. Cl. ............................ 463/20; 463/16; 463/21; 463/31; 273/138.1; 273/139

(58) Field of Classification Search .................. 463/16, 463/19–23, 30–32; 273/138.1, 139, 142 B
See application file for complete search history.

(56) References Cited

U.S. PATENT DOCUMENTS 1,978,395 A 10/1934 Groetchen
3,420,525 A 1/1969 Waders
3,642,287 A 2/1972 Lally et al.
3,735,987 A 5/1973 Ohki
4,326,351 A 4/1982 Heywood et al.
4,611,811 A 9/1986 Haase
4,695,053 A 9/1987 Vazquez, Jr. et al.
5,152,529 A 10/1992 Okada
5,364,100 A 11/1994 Ludlow et al.
5,395,111 A 3/1995 Inoue (Continued)

FOREIGN PATENT DOCUMENTS

EP 1 184 822 7/1982

(Continued)

OTHER PUBLICATIONS

Barn Yard Article, written by Strictly Slots, Aristocrat Technology, published Mar. 2002.

(Continued)

*Primary Examiner*—Peter DungBa Vo
*Assistant Examiner*—Arthur O. Hall
(74) *Attorney, Agent, or Firm*—K&L Gates LLP

(57) ABSTRACT

A gaming device and a method for operating a gaming device which increases the possibility of obtaining a winning combination of symbols on reels. In one embodiment, the gaming device rearranges at least two sets of indicated symbols on the reels to potentially generate additional combinations of symbols on a payline. The rearranged symbols may move to different reels and different paylines in the rearrangement. The gaming device, in one embodiment performs an evaluation of the rearranged symbols after each rearrangement to give each rearrangement a chance to generate a winning combination of symbols on the reels.

36 Claims, 22 Drawing Sheets

U.S. PATENT DOCUMENTS

| | | | | |
|---|---|---|---|---|
| 5,449,173 | A | 9/1995 | Thomas et al. | |
| 5,584,764 | A | 12/1996 | Inoue | |
| 5,664,998 | A | 9/1997 | Seelig et al. | |
| 5,752,881 | A | 5/1998 | Inoue | |
| 5,769,716 | A | 6/1998 | Saffari et al. | |
| 5,833,536 | A | 11/1998 | Davids et al. | |
| 5,882,259 | A | 3/1999 | Holmes, Jr. et al. | |
| 5,984,782 | A | 11/1999 | Inoue | |
| 5,997,400 | A | 12/1999 | Seelig et al. | |
| 5,997,401 | A | 12/1999 | Crawford | |
| 6,033,307 | A | 3/2000 | Vancura | |
| 6,056,642 | A | 5/2000 | Bennett | |
| 6,059,289 | A | 5/2000 | Vancura | |
| 6,086,066 | A | 7/2000 | Takeuchi et al. | |
| 6,089,976 | A | 7/2000 | Schneider et al. | |
| 6,089,977 | A | 7/2000 | Bennett | |
| 6,120,031 | A | 9/2000 | Adams | |
| 6,120,376 | A | 9/2000 | Bennett | |
| 6,135,885 | A | 10/2000 | Lermusiaux | |
| 6,142,875 | A | 11/2000 | Kodachi et al. | |
| 6,270,411 | B1 | 8/2001 | Gura et al. | |
| 6,290,600 | B1 | 9/2001 | Glasson | |
| 6,315,663 | B1 | 11/2001 | Sakamoto | |
| 6,316,663 | B1 | 11/2001 | Sakamoto | |
| 6,319,124 | B1 | 11/2001 | Baerlocher et al. | |
| 6,364,766 | B1 * | 4/2002 | Anderson et al. | 463/16 |
| 6,413,162 | B1 * | 7/2002 | Baerlocher et al. | 463/20 |
| 6,419,579 | B1 * | 7/2002 | Bennett | 463/20 |
| 6,517,432 | B1 * | 2/2003 | Jaffe | 463/16 |
| 6,551,187 | B1 | 4/2003 | Jaffe | |
| 6,561,900 | B1 | 5/2003 | Baerlocher et al. | |
| 6,589,114 | B2 | 7/2003 | Rose | |
| 6,602,136 | B1 | 8/2003 | Baerlocher et al. | |
| 6,659,864 | B2 | 12/2003 | McGahn et al. | |
| 6,676,512 | B2 | 1/2004 | Fong et al. | |
| 6,786,820 | B2 | 9/2004 | Gerrard et al. | |
| 6,855,054 | B2 | 2/2005 | White et al. | |
| 6,905,405 | B2 | 6/2005 | McClintic | |
| 6,908,383 | B2 | 6/2005 | Baerlocher et al. | |
| 6,988,947 | B2 | 1/2006 | Baerlocher et al. | |
| 7,070,502 | B1 | 7/2006 | Bussick et al. | |
| 2002/0016200 | A1 | 2/2002 | Baerlocher et al. | |
| 2002/0119814 | A1 * | 8/2002 | Fong et al. | 463/13 |
| 2003/0092480 | A1 * | 5/2003 | White et al. | 463/20 |
| 2003/0186737 | A1 * | 10/2003 | Bennett et al. | 463/20 |
| 2004/0012145 | A1 | 1/2004 | Inoue | |
| 2004/0014516 | A1 | 1/2004 | Inoue | |
| 2004/0014517 | A1 | 1/2004 | Inoue | |
| 2004/0018866 | A1 | 1/2004 | Inoue | |
| 2004/0026854 | A1 | 2/2004 | Inoue | |
| 2004/0036218 | A1 | 2/2004 | Inoue | |
| 2004/0038726 | A1 | 2/2004 | Inoue | |
| 2004/0048646 | A1 * | 3/2004 | Visocnik | 463/16 |
| 2004/0097280 | A1 | 5/2004 | Gauselmann | |
| 2004/0162128 | A1 | 8/2004 | Baerlocher et al. | |
| 2005/0051952 | A1 | 3/2005 | Jackson | |
| 2005/0164774 | A1 | 7/2005 | Gauselmann | |
| 2007/0178965 | A1 | 8/2007 | Inoue | |

FOREIGN PATENT DOCUMENTS

| | | |
|---|---|---|
| EP | 0 060 019 | 9/1982 |
| EP | 1 083 531 | 3/2001 |
| EP | 1 205 894 | 10/2001 |
| EP | 1 422 673 | 5/2004 |
| GB | 2 081 952 | 2/1982 |
| GB | 2 090 690 | 7/1982 |
| GB | 2 096 376 | 10/1982 |
| GB | 2 097 160 | 10/1982 |
| GB | 2 100 905 | 1/1983 |
| GB | 2 105 891 | 3/1983 |
| GB | 2 113 881 | 8/1983 |
| GB | 2 117 155 | 10/1983 |
| GB | 2 137 392 | 10/1984 |
| GB | 2 161 008 | 1/1986 |
| GB | 2 170 643 | 8/1986 |
| GB | 2 181 589 | 4/1987 |
| GB | 2 183 882 | 6/1987 |
| GB | 2 191 030 | 12/1987 |
| GB | 2 222 712 | 3/1990 |
| GB | 2 225 889 | 6/1990 |
| GB | 2 226 436 | 6/1990 |
| GB | 2 242 300 | 9/1991 |
| GB | 2 262 642 | 6/1993 |
| GB | 2 372 132 | 8/2002 |
| WO | WO 9732285 | 9/1997 |
| WO | WO 03/026756 | 4/2003 |

OTHER PUBLICATIONS

Cash Chameleon Advertisment, written by Aristocrat, published Jan. 2000.

Description of Animating Symbol Features in Gaming Machine, written by IGT, published Jan. 2000.

Description of Expanding Symbol, written by IGT, published Sep. 1999.

Description of Gaming Machine with Animating Symbols, written by IGT, published Jan. 2000.

Description of Symbol Feature in Australian UFO Gaming Machine, written by Barcrest Ltd., published 1995.

Description of Traveling Symbols, written by IGT, published Sep. 1999.

Easy Street Advertisments and Articles, written by Casino Data Systems, published in 2000.

Ghoulish Gamble Article, written by Strictly Slots, IGT, Sep. 2000.

Gold Fever Advertisement, written by Atronic Casino Technology, Ltd., published 1999.

Gold Fever Atronic Webpage, written by Atronic Casino Technology, published Mar. 2002.

Goooaal!, pp. 1-, written by Bally Gaming, Inc., published Dec. 2000.

Jewel in the Crown Advertisments, written by Barcrest Ltd., published 1999.

Marshall Fey, Slot Machines a pictorial History of the First 100 Years, Liberty Bell Books, pp. 79, 150, 171, 231, published 1983.

Mystery Mine Advertisement, Konami Australia Pty. Ltd., published Jan. 1999.

South Park Advertisement, written by IGT, published Sep. 1999.

* cited by examiner

Second Rotation of First Set - No Win

GAMING DEVICE HAVING A MULTIPLE SYMBOL SWAPPING GAME

PRIORITY CLAIM

This application is a divisional application of U.S. patent application Ser. No. 10/657,578, filed on Sep. 8, 2003, the entire contents of which are fully incorporated herein by reference.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates in general to a gaming device, and more particularly, to a gaming device with multiple symbols in different display positions which swap with one another upon a triggering event in a game. Gaming device manufacturers provide gaming machines having a plurality of reels, each reel including a plurality of symbols. In a reel game, the player causes the reels to spin by placing a wager on the game. The reels spin and then stop to display a generated combination of symbols on the reels. If a generated symbol or combination of symbols appears along an active payline associated with the reels or in a scatter pay, and the symbol or the combination of symbols corresponds to, or is associated with, an award, the player receives the award associated with the winning symbol or combination of symbols. It can be frustrating for a player to "almost win an award" when the symbols necessary for a winning combination appear together on the reels but are not in the proper configuration or order to produce a winning combination. One popular game feature which attempts to rectify the player's frustration in such a situation and increase the player's award opportunities is commonly referred to as a nudge feature or option. A nudge occurs after the reels initially spin and stop allowing the game or the player to move the reels through a limited rotation from a first or non-winning to a second and possibly winning position (to effect a winning combination or align a winning combination on an active payline).

In other games, the symbols are moved more than just a vertical nudge along the rotational path of the reels. U.K. Patent No. GB2,097,160, discloses a game wherein the player or the game switches the places of two entire reels. U.S. Pat. No. 6,089,977 discloses a game including a wild symbol which replaces a predetermined number of symbols on the reels to form different symbol combinations which include the wild symbol.

There is therefore a need for other ways of manipulating the position of symbols on the reels to create winning combinations on the reels. There is also a need for new and different games which employ reels.

SUMMARY OF THE INVENTION

The present invention provides a gaming device which performs a series of rearrangements of symbols and determines whether a winning combination of symbols exists after each rearrangement. In one embodiment, the gaming device includes multiple fixed positions, symbol display positions or defined areas on portions of the reels in which a plurality of symbols are displayed after the reels stop spinning or after an activation of the reels. In one embodiment, the reels include a plurality of swapping indicators associated with the plurality of the symbols on the reels.

Each reel spins independently of the other reels coming to a stop or a stop position to establish a first position for each of the symbols. The spinning or activation of the reels, in one embodiment, establishes a first position of the symbols in the fixed positions on the reels. The gaming device, in one embodiment, first determines if a winning combination has occurred along one or more of the paylines. If no winning combination exists, or, alternatively, after an award for a winning combination is provided to the player, the gaming device determines if a plurality of symbols are indicated on the reels.

In one embodiment, if a predetermined number of swapping indicators associated with a plurality of the generated symbols line up, match one another, are adjacent to one another or, alternatively, form a predetermined configuration on the display, a set of indicated symbols is identified, and the gaming device initiates a symbol swapping rearrangement limited to the set of indicated symbols. In one embodiment, the swapping indicators associated with symbols on adjacent reels must align with one another to initiate a rearrangement.

The symbol swapping rearrangement, in one embodiment, includes moving the symbols associated with the swapping indicators to a different fixed position and, in one embodiment, to the fixed positions of the other symbols which are swapped. In one embodiment, a plurality of symbols above or below or beside one another exchange positions with one another. A symbol can traverse or cross over to another payline or another reel, or another position on the same reel. A symbol is thus able to move from one position on the reel to another position on the same reel. Alternatively, or in addition, a symbol is able to move to an adjacent or different reel. In one embodiment, the rearrangement includes rotating the indicated symbols in a counter-clockwise fashion on the reels. Alternatively, the symbols can rotate in a clockwise direction. It should be appreciated that any suitable movement of a symbol in the indicated set to any fixed position or position previously occupied by one of the other symbols in the set is contemplated by the present invention.

In one embodiment of the present invention, a predetermined configuration of swapping indicators associated with four symbols triggers a rearrangement of those symbols on the reels. Two of the four symbols appear together on a first reel and are adjacent to the other two symbols which appear together on a second reel. Upon the initiation of a rearrangement, the four symbols, in one embodiment, each rotate in a clockwise or counterclockwise fashion. One symbol moves down the reel into the position of a second symbol; the second symbol moves to the adjacent reel to the position of a third symbol; the third symbol moves in an upward direction to replace the fourth symbol on the same reel; and the fourth symbol moves to the position of the first symbol. It should be appreciated that the rearrangement of the symbols can vary in direction, sequence, and in the number of positions moved.

In one embodiment, after each symbol swapping rearrangement, the gaming device determines if a winning combination has occurred on the reels such as along one or more paylines as a result of the rearrangement. In one embodiment, the player receives any award or outcome associated with a winning combination comprising the rearranged symbols. In one embodiment, the gaming device continues to rotate or rearrange the symbols and to reevaluate the existence of any other winning combinations. It should be appreciated that the rearrangement can occur a plurality of times, and the player, in one embodiment, may receive the awards associated with each of the winning combinations generated by the rearrangement of the symbols. Alternatively, the gaming device rearranges the symbols until a winning combination of symbols is generated.

In one embodiment, the indicated symbols continue to undergo a symbol swapping rearrangement until all predetermined symbol combinations of the indicated symbols are generated or until, as in one embodiment, each of the indicated symbols are rearranged to their original positions. Alternatively, in an embodiment in which the symbol swapping indicators are associated with the symbols, the indicated symbols are rearranged only if a triggering configuration of the swapping indicators occurs with each rearrangement.

It should also be appreciated that multiple rearrangements or rotations can occur when more than one set of swapping indicators align to trigger a rearrangement or rotation as a result of the initial spin of the reels or any subsequent rearrangement of indicated symbols. In an embodiment in which the symbol swapping indicators are associated with each of the symbols, rearrangement of the indicated symbols may position the symbol swapping indicators in a configuration which indicates another set of symbols.

In one embodiment in which multiple sets of symbols are simultaneously indicated for rearrangement, the predetermined symbol combinations of the rearranged symbols of one set of indicated symbols are evaluated before the rearrangement of another set of indicated symbols occurs. In one embodiment, this evaluation occurs after each rearrangement of the indicated symbols in that set. Alternatively, an evaluation occurs after each set of indicated symbols undergoes at least one rearrangement. In a further alternative embodiment, an evaluation occurs between the rearrangement of the indicated symbols of one set and the rearrangement of the indicated symbols of another set in an alternating fashion. It should be appreciated that an evaluation of the rearranged indicated symbols for a winning combination of symbols can occur at any suitable time and with any suitable frequency as desired by the implementer of the gaming device.

It is therefore an advantage of the present invention to add a feature to a gaming device which provides increased excitement and enjoyment to the player.

A further advantage of the present invention to provide a gaming device which increases the chances of a player obtaining an award.

It is also an advantage of the present invention to selectively rearrange symbols to increase the likelihood of forming a winning combination of symbols.

It is an advantage of the present invention to provide a reel game that generates multiple combinations of symbols with each spin of the reels.

It is an advantage of the present invention to provide a reel game having symbols which can change reels to potentially form a winning combination.

Other objects, features and advantages of the invention will be apparent from the following detailed disclosure, taken in conjunction with the accompanying sheets of drawings, wherein like numerals refer to like parts elements, components, steps and processes.

DETAILED DESCRIPTION OF THE INVENTION

Figure 1A:
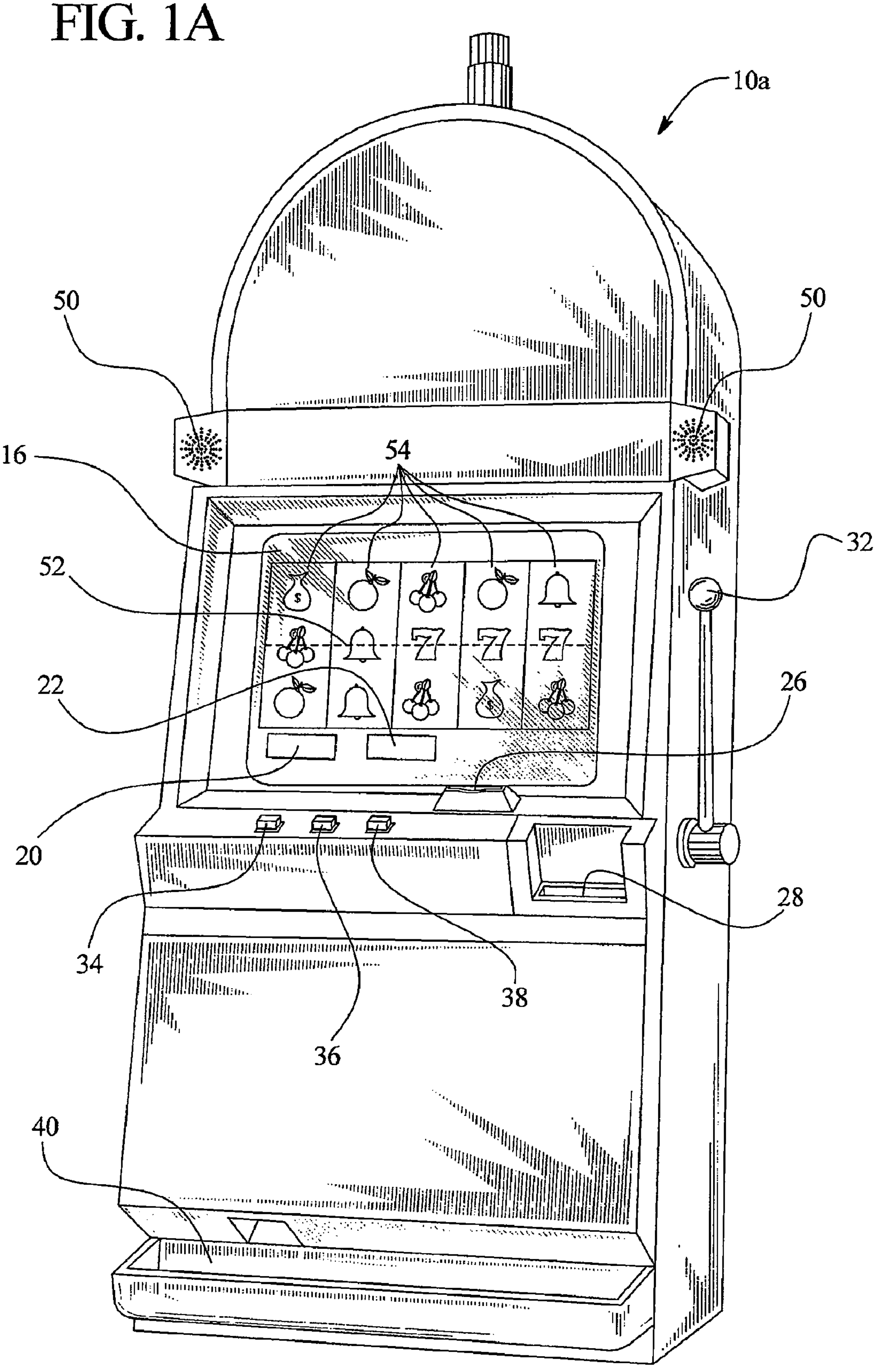
FIG. 1A is a front perspective view of one embodiment of the gaming device of the present invention.
Figure 1B:
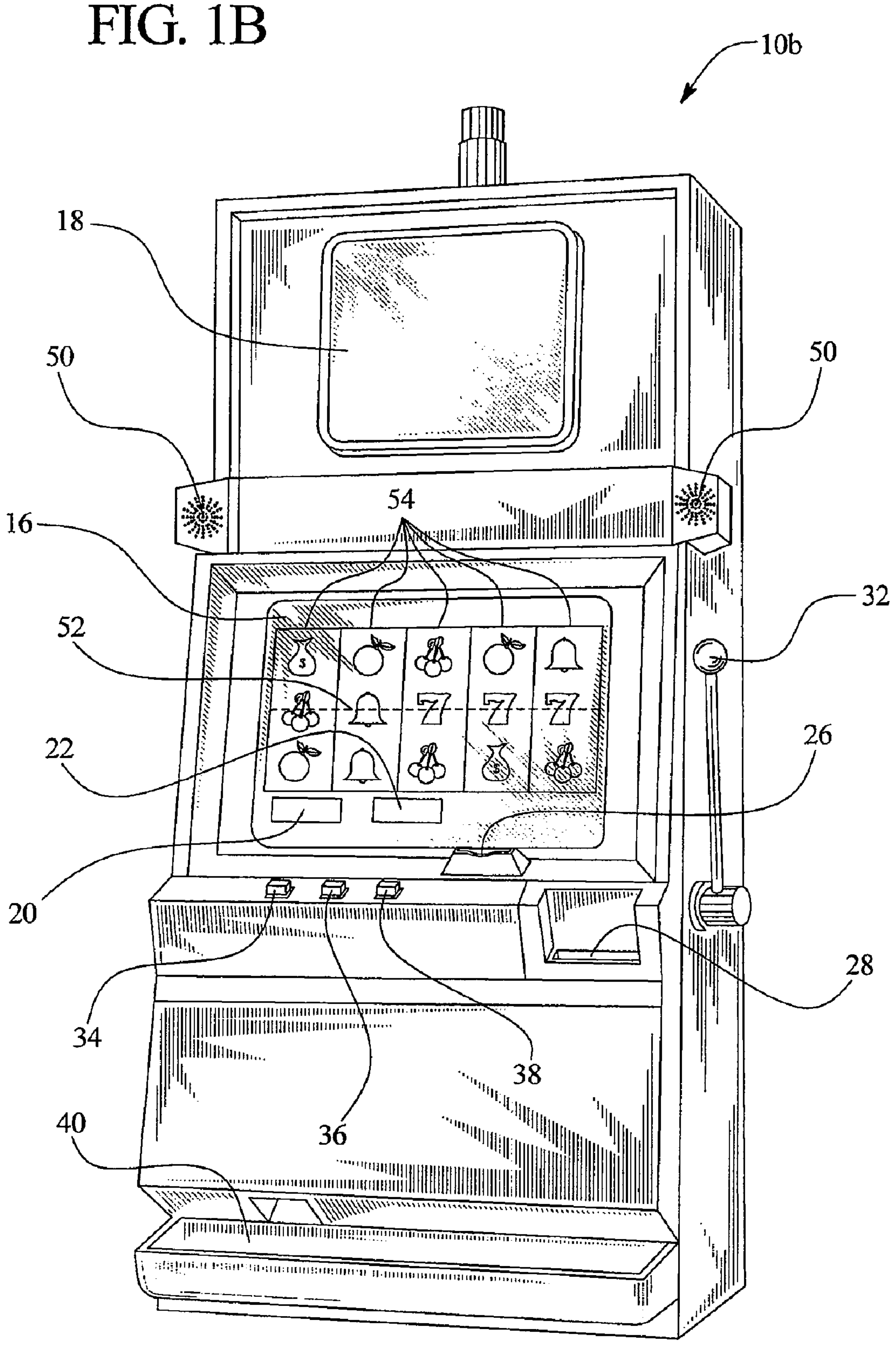
FIG. 1B is a front perspective view of another embodiment of the gaming device of the present invention.

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
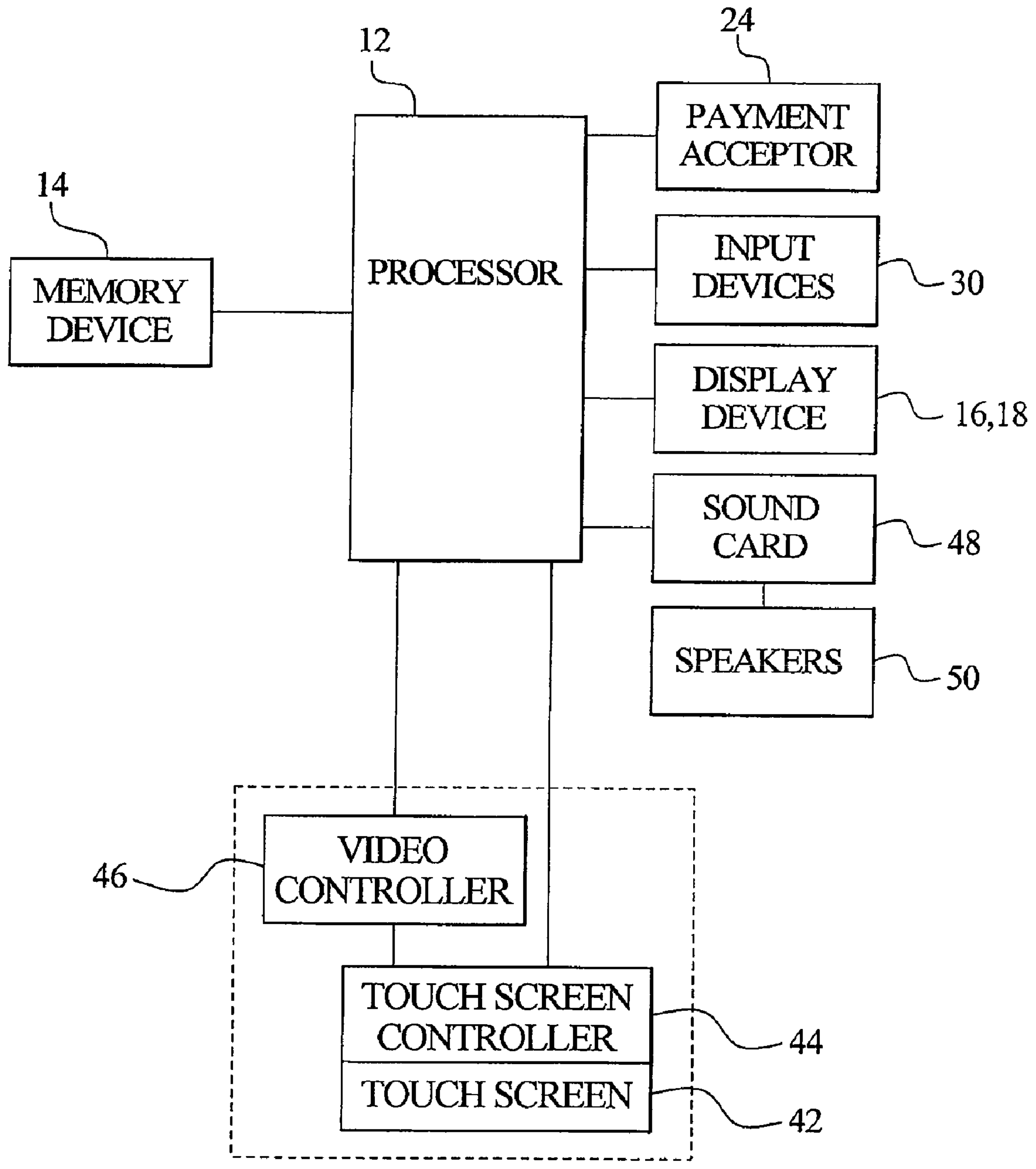
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. As seen in FIGS. 1A and 1B, in one embodiment, gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, rectangle, elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 26. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

Gaming device 10 can incorporate any suitable wagering primary or base game. The gaming machine or device of the present invention may include some or all of the features of conventional gaming machines or devices. It should be appreciated that, if the present invention is the a base or primary game or is incorporated into the base or primary game, the bonus or secondary game may comprise any suitable reel-type game, card game, number game or other game of chance susceptible to representation in an electronic or electromechanical form which produces a random outcome based on probability data upon activation from a wager. Alternatively, the base or primary game may comprise any suitable reel-type game, card game, number game or other game of chance and the present invention is the bonus or secondary or is incorporated into the bonus or secondary game. That is, different primary wagering games, such as video poker games, video blackjack games, video keno, video bingo or any other suitable base or primary game may be played in combination with the present invention.

In one embodiment, as illustrated in FIGS. 1A and 1B, a base or primary game or a bonus or secondary game may be a slot game with one or more paylines 52. The paylines may be horizontal, vertical, circular, diagonal, angled or any combination thereof. In this embodiment, the gaming device displays at least one and preferably a plurality of reels 34, such as three to five reels 34 in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In another embodiment, if the reels 34 are in video form, the plurality of simulated video reels 34 are displayed on one or more of the display devices as described above. Each reel 34 displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active pay line or otherwise occur in a winning pattern.

In one embodiment, a base or primary game or a bonus or secondary game may be a poker game wherein the gaming device enables the player to play a conventional game of video poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and replacement cards are dealt from the remaining cards in the deck. This results in a final five-card hand. The final five-card hand is compared to a payout table which utilizes conventional poker hand rankings to determine the winning hands. The player is provided with an award based on a winning hand and the credits the player wagered.

In another embodiment, a base or primary game or a bonus or secondary game may be a multi-hand version of video poker. In this embodiment, the player is dealt at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game or a bonus or secondary game may be a keno game wherein the gaming device displays a plurality of selectable indicia or numbers on at least one of the display devices. In this embodiment, the player selects at least one and preferable a plurality of the selectable indicia or numbers via an input device or via the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game; he must win or earn entry through play of the primary game and, thus, play of the primary game is encouraged. In another embodiment, qualification of the bonus or secondary game could be accomplished through a simple "buy in" by the player if, for example, the player has been unsuccessful at qualifying through other specified activities.

Figure 2B:
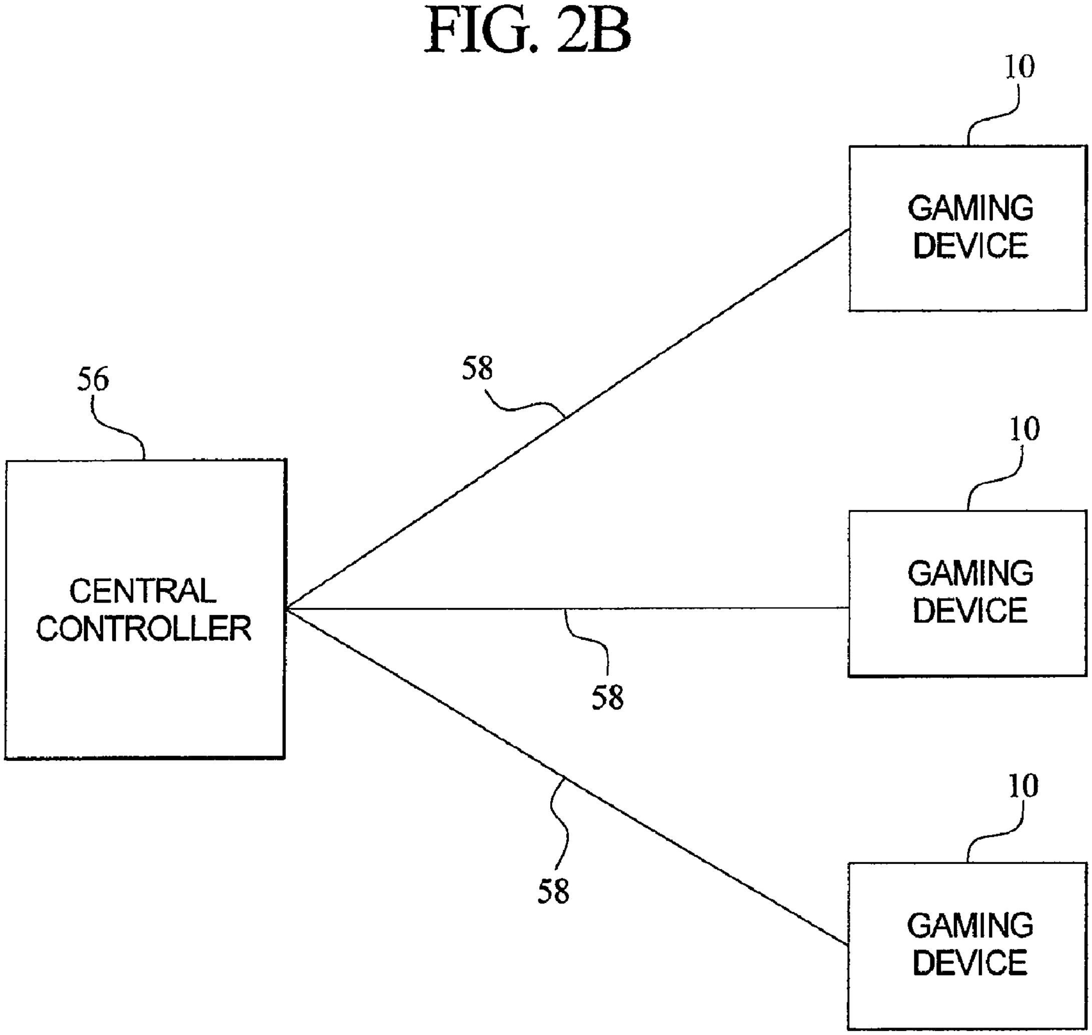
FIG. 2B is a schematic block diagram of a central determination embodiment of the gaming device of the present invention.

In one embodiment, as illustrated in FIG. 2B, one or more of the gaming devices 10 of the present invention may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an Internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

Referring now to FIGS. 3A to 3E, in one embodiment of the present invention, the gaming device displays a plurality of fixed positions on each of five reels 54*a*, 54*b*, 54*c*, 54*d* and 54*e*. The illustrated gaming device also has four paylines 52*a*, 52*b*, 52*c* and 52*d* associated with the reels. The illustrated gaming device also has a plurality of symbols 102 which, in this example, are represented by the letters A, B, C, D, E and F displayed on the reels. It should be appreciated that the symbols can include any suitable character, numeral, indicia or image. In one embodiment, a plurality of swapping indicators 104*a*, 104*b*, 104*c* and 104*d* are associated with a plurality of the symbols 102.

In one embodiment, the game begins by activating the reels areas. In the embodiment illustrated in FIG. 3A, the gaming device spins the reels to rearrange the symbols. In one embodiment, the symbols remain associated with their respective fixed positions through this first rearrangement. As in a conventional reel game, each reel spins independently of the other reels until each reel stops at a generated stop position to indicate a combination of symbols, if any, along the paylines. U.S. Pat. No. 6,413,162 issued on Jul. 2, 2002 and assigned to IGT discloses a different reel arrangement. It should be appreciated that the present invention can employ the reels disclosed in that patent.

Figure 3A:
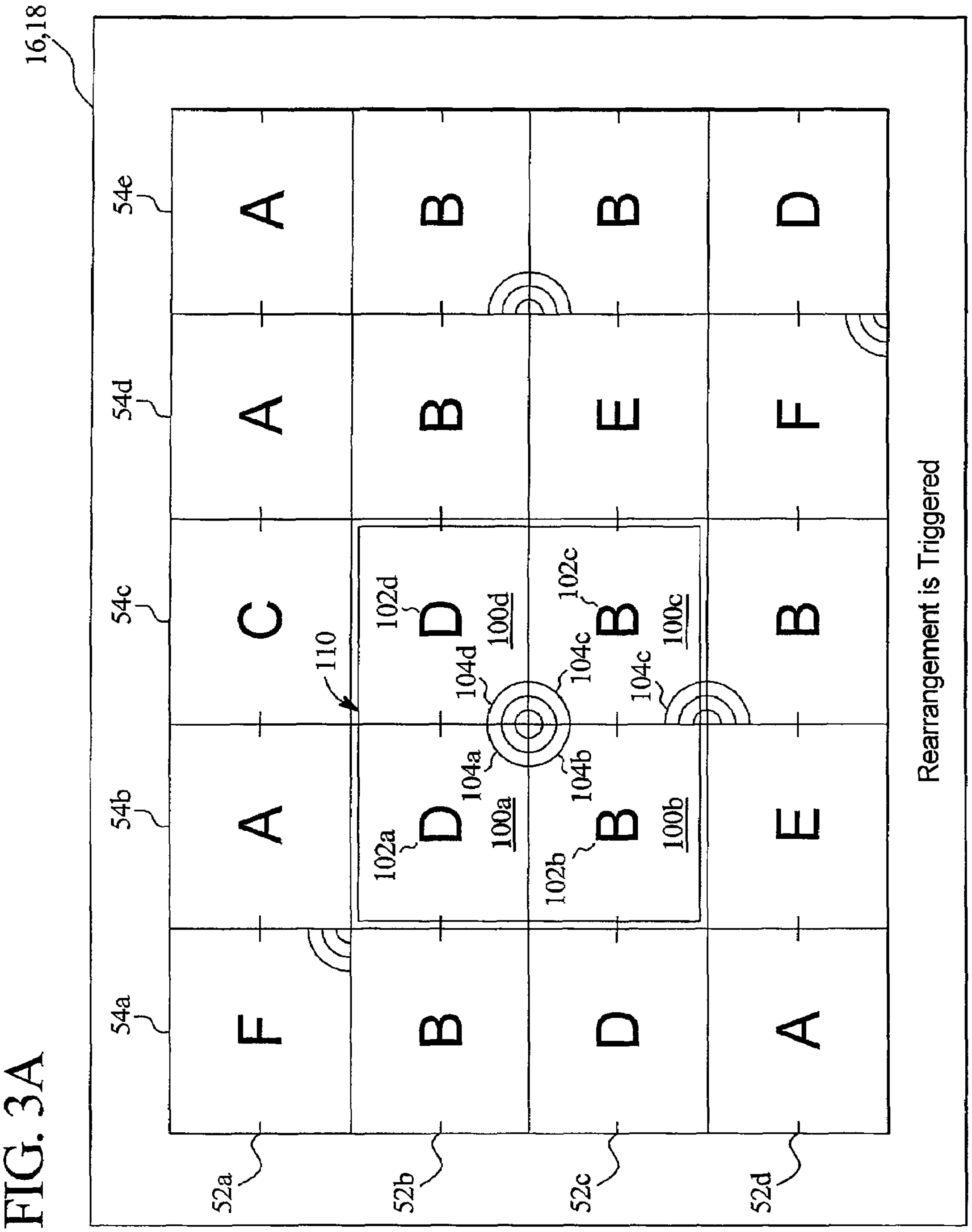
FIGS. 3A, 3B, 3C, 3D and 3E are front perspective views of one embodiment of the present invention illustrating a rearrangement of one set of symbols.

In FIG. 3A, the swapping indicators 104*a* to 104*d* represented by four radial quadrants associated with each of four symbols 102*a* to 102*d*, respectively generated along paylines 52*b* and 52*c* on two different reels, have aligned or matched to form, in the illustrated embodiment, a plurality of concentric circles. It should be appreciated that each of the swapping indicators can be any suitable shape, size, degree of illumination, or any suitable indicia to combine with other swapping indicators to form any suitable configuration, pattern or arrangement to indicate a set of symbols to be swapped or rearranged. In one embodiment, as illustrated in FIG. 3A, the matching or alignment of the swapping indicators triggers the rearrangement of the set of four indicated symbols. In FIG. 3A, the set of indicated symbols to be rearranged includes the D symbol 102*a* in position or fixed position 100*a*, the B symbol 102*b* in fixed position 100*b*, the B symbol 102*c* in fixed position 100*c*, and the D symbol 102*d* in fixed position 100*d*. Although the swapping indicators of the two B symbols on reel 54*c* and the two B symbols on reel 54*e* match one another, the gaming device, in the illustrated embodiment, does not recognize the alignment of less than four swapping indicators to trigger the rearrangement of the symbols. It should be appreciated, however, that any suitable number of swapping indicators can trigger the rearrangement of at least three indicated symbols to each swap or move to at least one other locations in one embodiment.

Figure 3B:
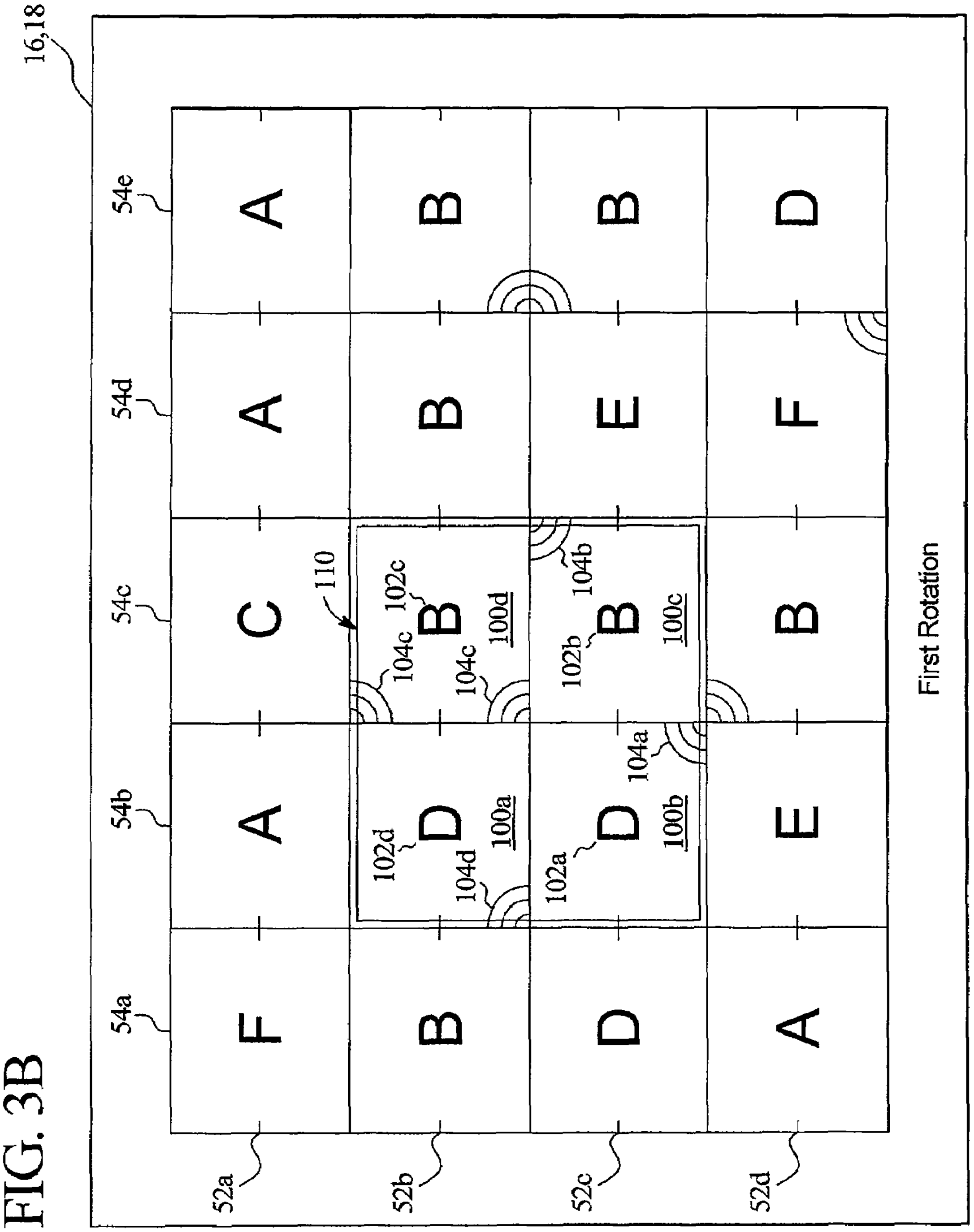

In FIGS. 3A and 3B, after the first evaluation for winning combinations, the D symbol 102*a* in fixed position 100*a* moves to fixed position 100*b*. The B symbol 102*b* in fixed position 100*b* moves to the fixed position 100*c* on the adjacent reel 54*c*. The B symbol 102*c* in fixed position 100*c* of reel 54*c* moves to the fixed position 100*d* on reel 54*c*. The D symbol 102*d* in fixed position 100*d* on reel 54*c* moves to the fixed position 100*a* on the adjacent reel 54*b*. It should be appreciated that the symbols, in one embodiment, move in a counter-clockwise rotation within the four fixed positions 100*a* to 100*d* on the two reels 54*b* and 54*c*. Alternatively, it should be appreciated that the symbols can rotate in a clockwise direction within the four positions on the two reels, or the symbols can move in any other random or predetermined direction, sequence or configuration sequentially or randomly.

Once a rearrangement or rotation of the set of indicated symbols occurs, the gaming device re-evaluates the symbols indicated on each of the active paylines to determine if a winning combination associated with an award exists on the display. In FIG. 3B, the same symbol, B is generated along the same payline 52*b* on all the reels, except for the D symbol 102*d* on reel 54*b*.

Figure 3C:
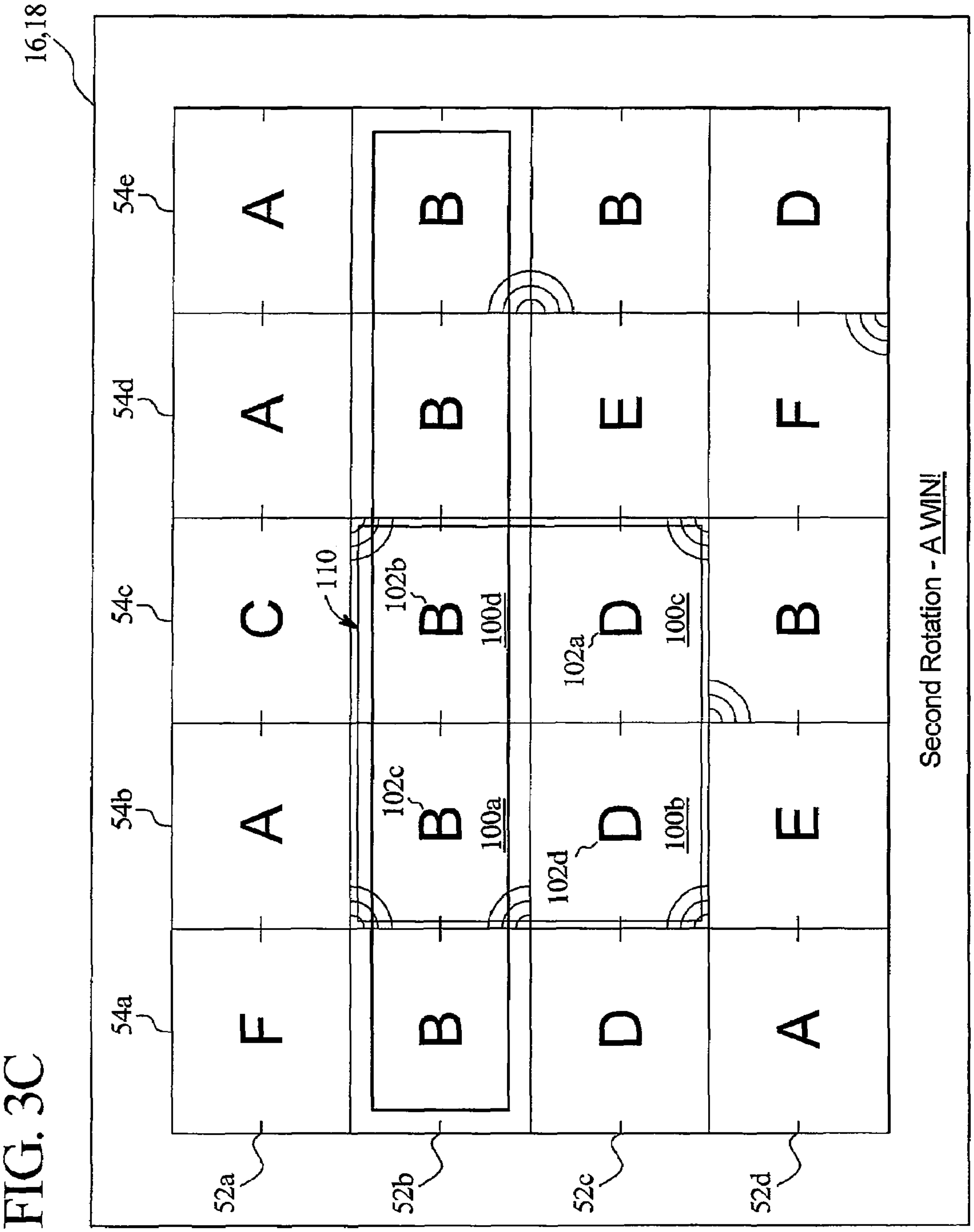

In FIGS. 3B and 3C, the D symbol 102*d* in fixed position 100*a* moves to fixed position 100*b*. The D symbol 102*a* in fixed position 100*b* moves to the fixed position 100*c* on the adjacent reel 54*c*. The B symbol 102*b* in fixed position 100*c* of reel 54*c* moves to the fixed position 100*d* on reel 54*c*. The B symbol 102*c* in fixed position 100*d* on reel 54*c* moves to the fixed position 100*a* on the adjacent reel 54*b*. As performed after the first rearrangement illustrated in FIG. 3B, the gaming device reevaluates the active paylines to determine if a winning combination is associated with an award in the game. As a result of the rearrangement of the set of indicated symbols in the embodiment illustrated in FIG. 3C, a combination of five of the same "B" symbols on payline 52*b* is associated with an award in the game, and the gaming device provides the player the award. It should be appreciated that any suitable award or outcome can be associated with a predetermined winning combination of symbols on the reels as discussed above.

Figure 3D:
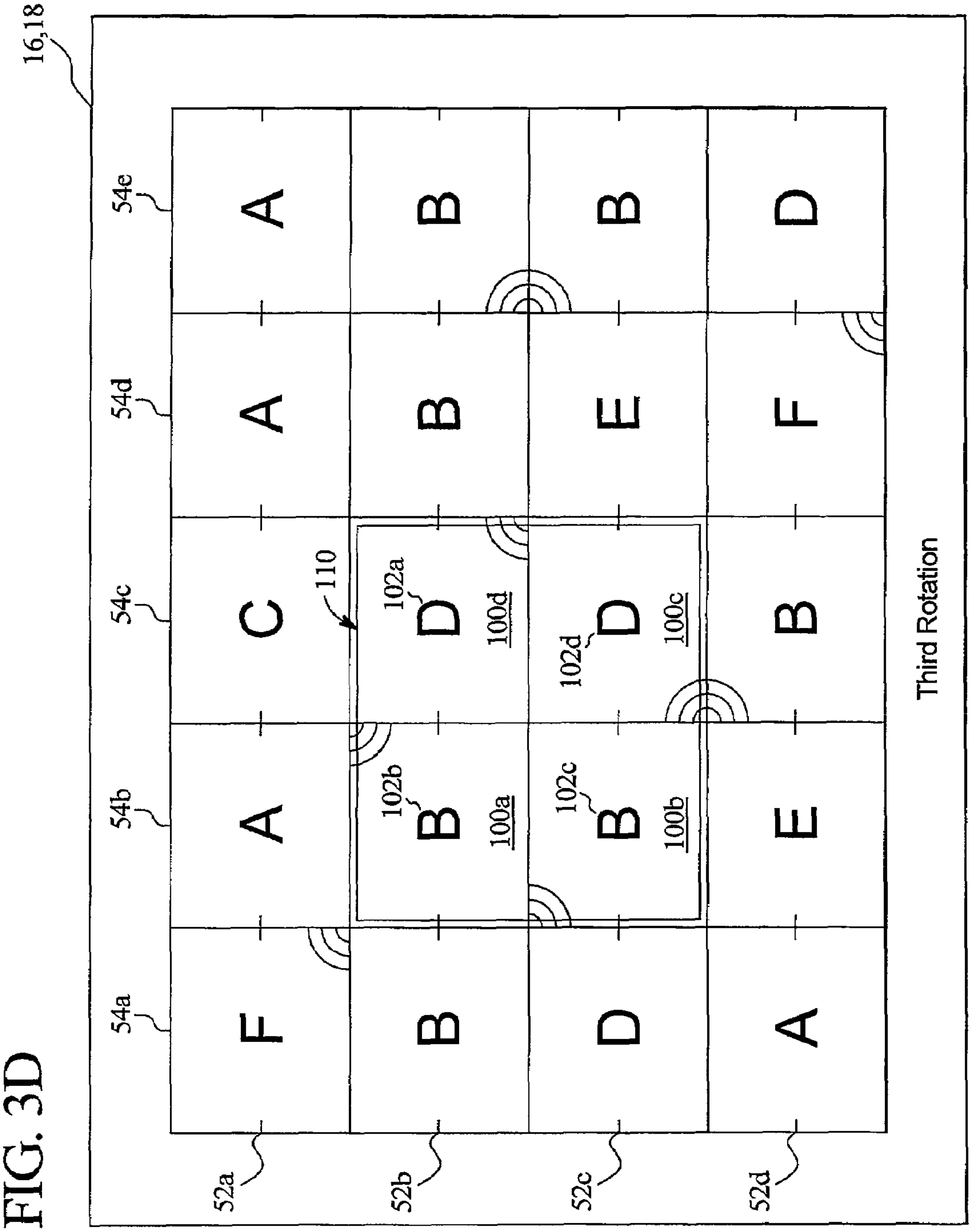

In one embodiment, the gaming device continues to perform rearrangements of the set of indicated symbols even after a winning combination has occurred on the reels. In one embodiment the rearrangement of the set of indicated symbols continues until the indicated symbols are returned to the original fixed positions the symbols occupied after the initial spinning of the reels. Alternatively, the symbols are rearranged less than the number of times required to return each of the symbols to their original fixed positions. In FIGS. 3C and 3D, the B symbol 102*c* in fixed position 100*a* moves to fixed position 100*b* on reel 54*b*. The D symbol 102*d* in fixed position 100*b* moves to fixed position 100*c* on the adjacent reel 54*c*. D symbol 102*a* in fixed position 100*c* moves to fixed position 100*d* on reel 54*c*. The B symbol 102*b* in fixed position 100*d* moves to fixed position 100*a* on the adjacent reel 54*b* to complete the rearrangement sequence. The gaming device reevaluates the active paylines to determine if a winning combination exists. Payline 52*b* includes all B symbols except for a D symbol on reel 54*c* which is not a winning combination of symbols.

Figure 3E:
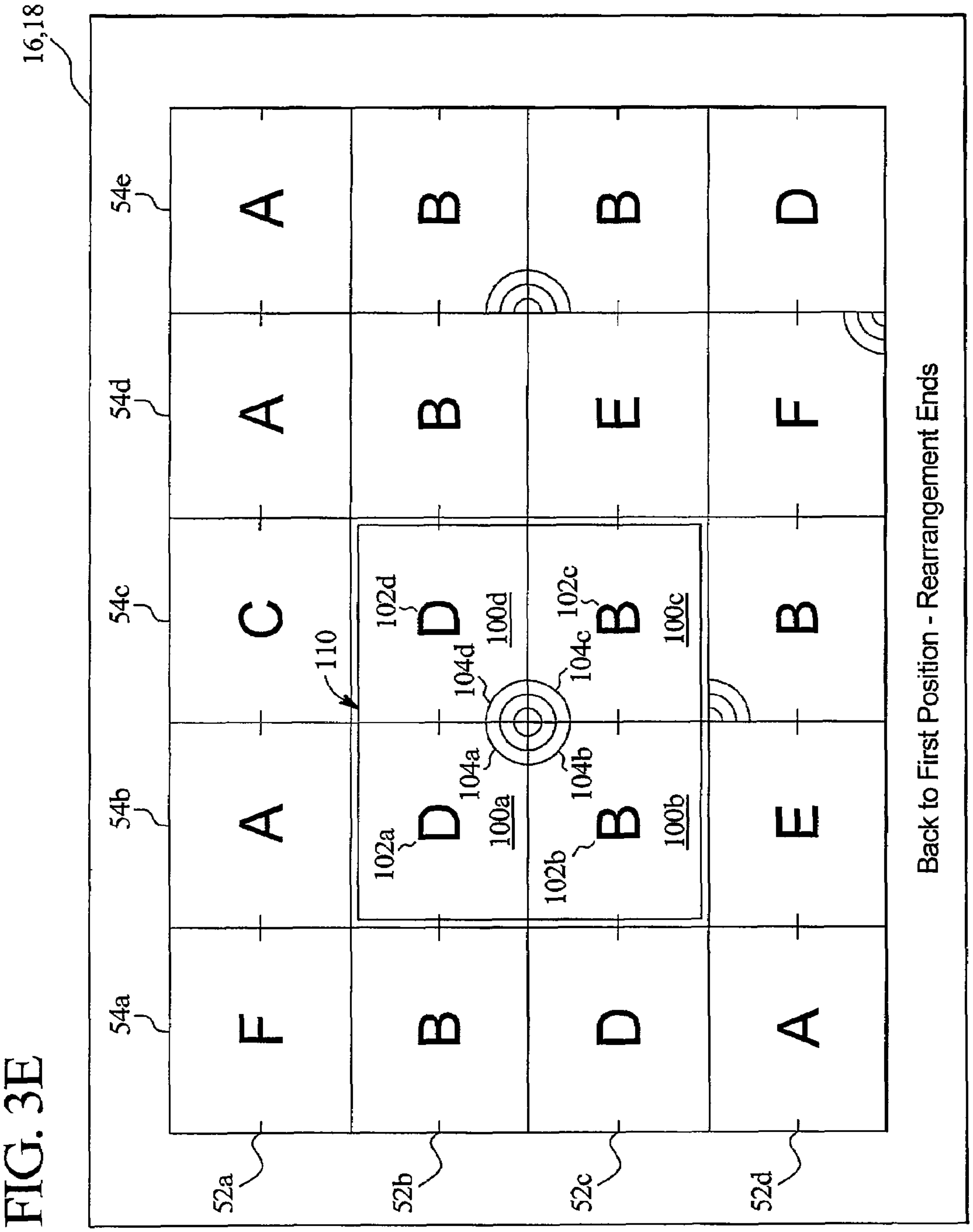

In one embodiment, the rearrangement continues to occur. In FIGS. 3D and 3E, the B symbol 102*b* in fixed position 100*a* moves to fixed position 100*b* on reel 54*b*. The B symbol 102*c* in fixed position 100*b* moves to fixed position 100*c* on the adjacent reel 54*c*. The D symbol 102*d* in fixed position 100*c* moves to fixed position 100*d* on reel 54*c*. The D symbol 102*a* in fixed position 100*d* moves to fixed position 100*a* on the adjacent reel 54*b*. Upon completion of this rearrangement cycle, it should be appreciated that an entire rotation has occurred on the reels, and the symbols 102*a* to 102*d* have returned to their original fixed positions 100*a* to 100*d*, respectively. The gaming device, in one embodiment, reevaluates the possible winning combinations of symbols after each indicated symbol has been moved to each of the fixed positions associated with the indicated symbols. It should be appreciated that any additional rotation in either direction or any rearrangement of the symbols would yield the same results as produced in the previous three rearrangements or rotations.

Figure 4A:
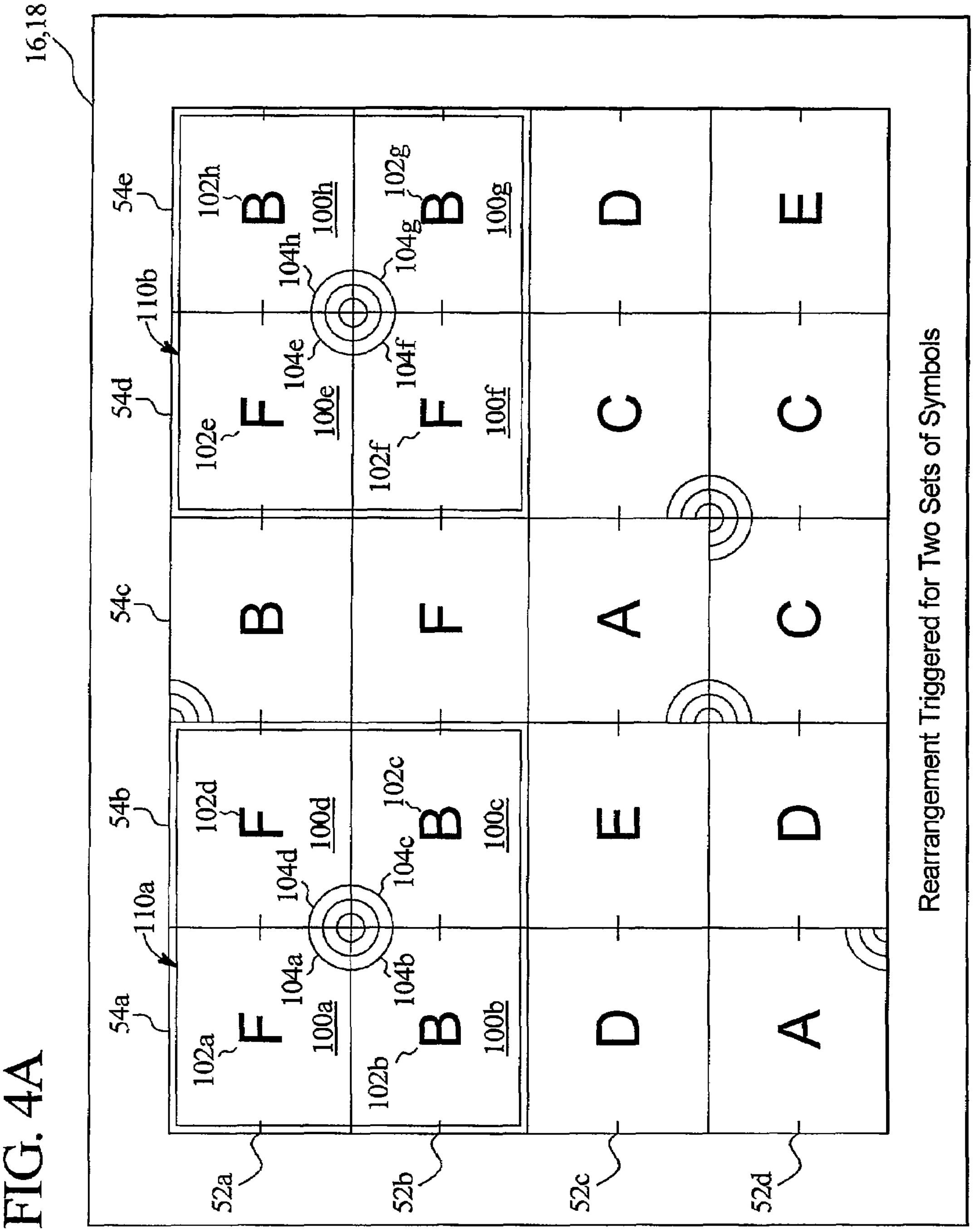
FIGS. 4A, 4B and 4C are front perspective views of one embodiment of the present invention illustrating a rearrangement of two sets of symbols.
Figure 4B:
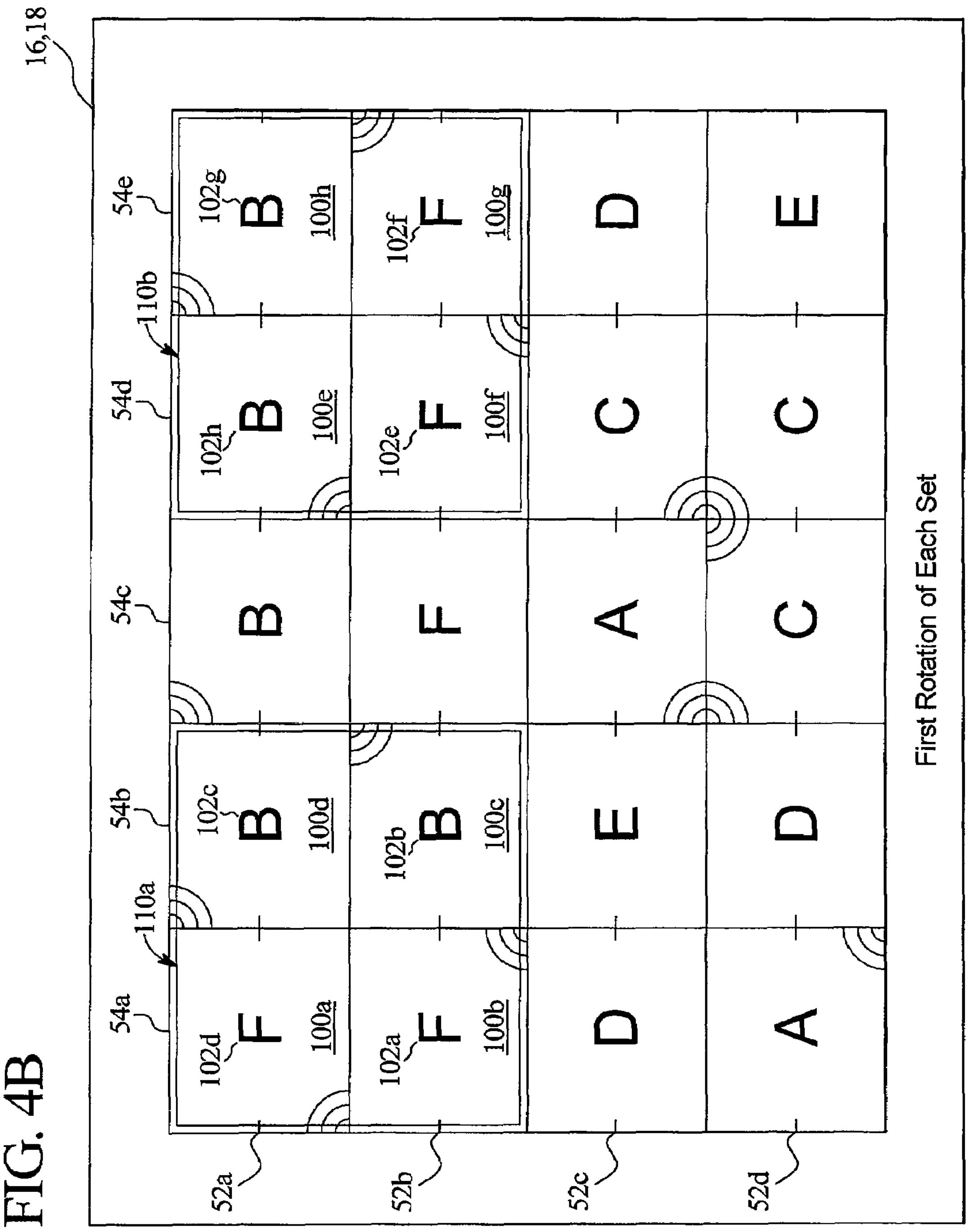
Figure 4C:
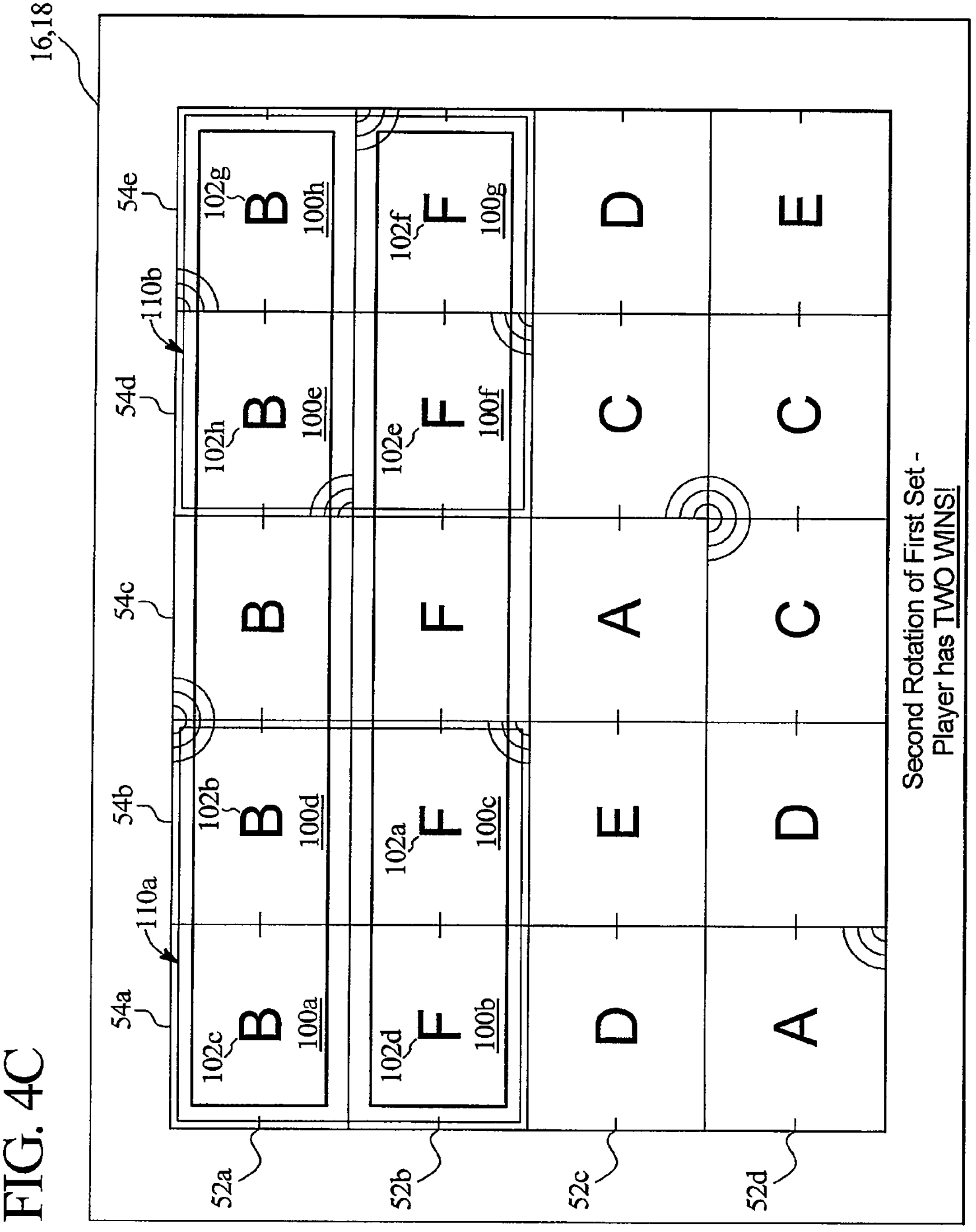

Referring now to FIGS. 4A to 4C, in one embodiment of the present invention the gaming device generates more than one set of indicated symbols on the reels. In FIG. 4A, the indicators of two sets 110*a* and 110*b* of four symbols each are aligned on the reels to trigger a symbol rearrangement or rotation within each of the four fixed positions associated with the indicated symbols on the reels. Again, other symbol indicators have aligned such as the C symbols on paylines 52*c* and 52*d* on reels 54*c* and 54*d*, respectively. However, the indicator for symbol A is not in alignment with the other symbol indicators as required by the illustrated embodiment. In one embodiment, the rearrangement or rotation of the indicated symbols on the reels occurs simultaneously, changing up to four of the five symbols on a single payline between each re-evaluation of the paylines by the gaming device to determine if a winning combination exists. Alternatively, one set of indicated symbols rotates, and the gaming device determines if any winning symbol combinations exist before the rearrangement of another set of indicated symbols. It should be appreciated that this embodiment of rearranging one set of indicated symbols before reevaluating symbol combinations provides more potential winning combinations and is more desirable to the player. In FIGS. 4A to 4B, the indicated symbols 102*a* to 102*d* of the first set 110*a* are rearranged. The F symbol 102*a* in fixed position 100*a* moves to fixed position 100*b* on reel 54*a*. The B symbol 102*b* in fixed position 100*b* on reel 54*a* moves to fixed position 100*c* on the adjacent reel 54*b*. The B symbol 102*c* in fixed position 100*c* on reel 54*b* moves to fixed position 100*d* on reel 54*b*. The F symbol 102*d* in fixed position 100*d* on reel 54*b* moves to fixed position 100*a* on the adjacent reel 54*a*. As discussed above, in one embodiment, the gaming device performs an evaluation of the active paylines before rearranging the second set of indicated symbols.

In similar fashion, the second set of 110*b* of indicated symbols 102*e* to 102*h* are rearranged. The F symbol 102*e* in fixed position 100*e* on reel 54*d* moves to fixed position 100*f* on reel 54*d*. The F symbol 102*f* in fixed position 100*f* on reel 54*d* moves to fixed position 100*g* on the adjacent reel 54*e*. The B symbol 102*g* in fixed position 100*g* on reel 54*e* moves to fixed position 100*h* on reel 54*e*. The B symbol 102*h* in fixed position 100*h* on reel 54*e* moves to fixed position 100*e* on the adjacent reel 54*d*. The gaming device then re-evaluates the paylines for additional winning combinations associated with a predetermined award or outcome in the game. In one embodiment illustrated in FIG. 4B, because the F symbol 102*d* appearing on payline 52*a* on reel 54*a* is different than the remaining B symbols on payline 52*a*, there is no winning combination. Similarly, five of the same symbols are not generated along payline 52*b* of the reels. In one embodiment, the rotation or rearrangement occurs again, and an additional re-evaluation occurs after the rearrangement.

In FIGS. 4B and 4C, the first set of indicated symbols 110*a* on reels 54*a* and 54*b* undergo an additional rearrangement or rotation. In one embodiment, the rearrangement of the symbols continues in an alternating fashion regardless of the favorable outcome which would result from discontinuing the rearrangement of one of the sets of indicated symbols. In an alternative embodiment, the gaming device or, alternatively, the player can make a determination whether a rotation of symbols occurs. In FIG. 4C, for example, the second set of indicated symbols 110*b* includes B symbols 102*h* and 102*g* generated along payline 52*a* on reels 54*d* and 54*e*, respectively, and the second set of indicated symbols 110*b* includes F symbols 102*e* and 102*f* on payline 52*b* on reels 54*d* and 54*e*, respectively, in positions which are potentially favorable to the player. All but one symbol on each of the paylines 52*a* and 52*b* are a winning combination. An additional rearrangement or rotation of the first set of indicated symbols 110*a* on reels 54*a* and 54*b*, however, provides winning combinations on paylines 52*a* and 52*b* as illustrated in FIG. 4C. In one embodiment, the gaming device provides the player at least one award or outcome for the two winning combinations.

Figure 5A:
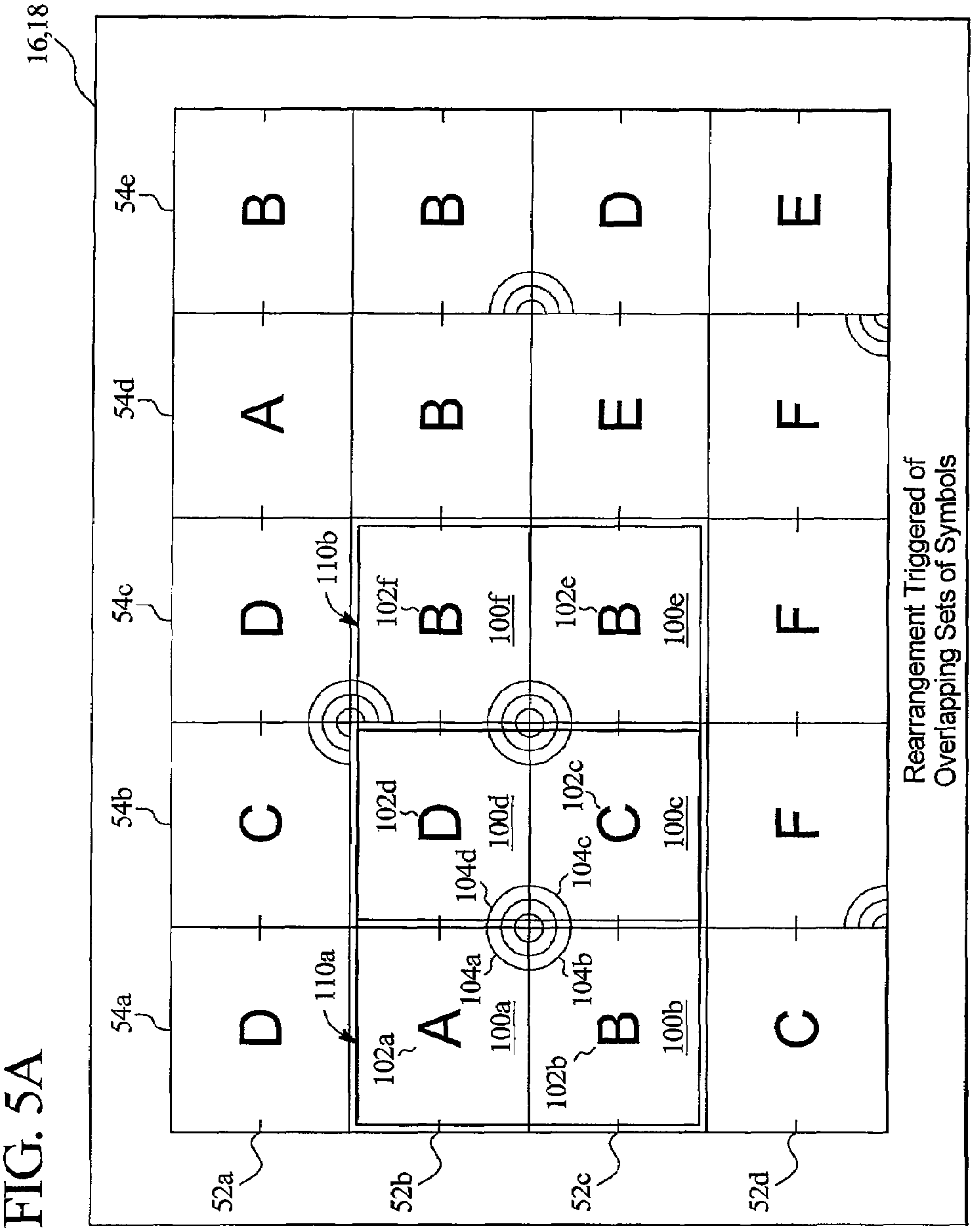
FIGS. 5A, 5B, 5C, 5D and 5E are front perspective views of one embodiment of the present invention illustrating a rearrangement of two overlapping sets of symbols.

In FIGS. 5A to 5E, in one embodiment of the present invention, the gaming device generates overlapping sets of indicated symbols on three different reels, as illustrated in FIG. 5A. In one embodiment, the first set of indicated symbols 110*a* on reels 54*a* and 54*b* are the first set of indicated symbols to rearrange or rotate to new positions. The second set of indicated symbols on reels 54*b* and 54*c* subsequently or, alternatively, simultaneously, rearrange or rotate to new positions. In one embodiment, the gaming device re-evaluates the paylines between each alternating rotation of the symbols on each of the three reels. In a further embodiment, the gaming device alternates between rearranging and evaluating the indicated symbols on reels 54*a* and 54*b* until the symbols in one set are rearranged to their respective original fixed positions. Thereafter, the second set of indicated symbols on reels 54*b* and 54*c* proceed through a series of rotations and re-evaluations of the paylines until the symbols of that set return to their respective original fixed positions.

Figure 5B:
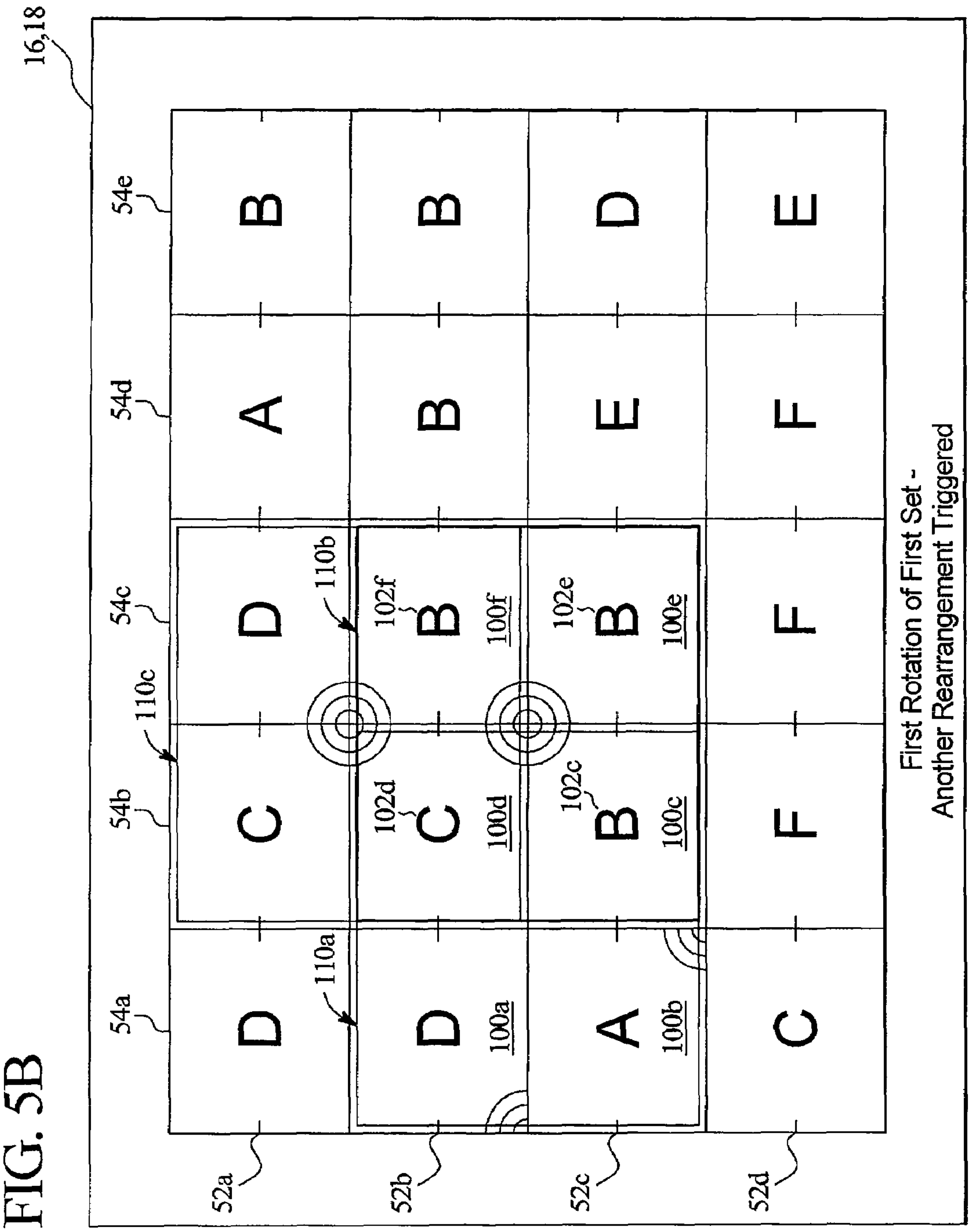

In FIGS. 5A and 5B, the gaming device rearranges the first set of indicated symbols 110*a*. The A symbol 102*a* in fixed position 100*a* moves to fixed position 100*b* on reel 54*a*. The B symbol 102*b* in fixed position 100*b* moves to fixed position 100*c* on the adjacent reel 54*b*. The C symbol 102*c* in fixed position 100*c* moves to fixed position 100*d* on reel 54*b*. The D symbol 102*d* in fixed position 100*d* moves to fixed position 100*a* on the adjacent reel 54*a*.

In one embodiment, the swapping indicators are associated with the symbols such that a rearrangement of the symbols of an indicated set of symbols may cause the swapping indicators associated with those symbols to align or trigger or indicate another set of symbols. In FIG. 5B, the first set of symbols 110*a* indicated on reels 54*a* and 54*b* have rearranged or rotated and have created an additional set of four indicated symbols 110*c* on paylines 52*a* and 52*b* on reels 54*b* and 54*c*. In one embodiment, the additional set of indicated symbols 110*c* enter a series of alternating or sequential rotations and re-evaluations of potential winning combinations on the paylines by the gaming device. In the illustrated embodiment in FIG. 5B, only the original indicated sets of symbols continue to be rearranged and re-evaluated for purposes of determining a winning combination on the paylines.

Figure 5C:
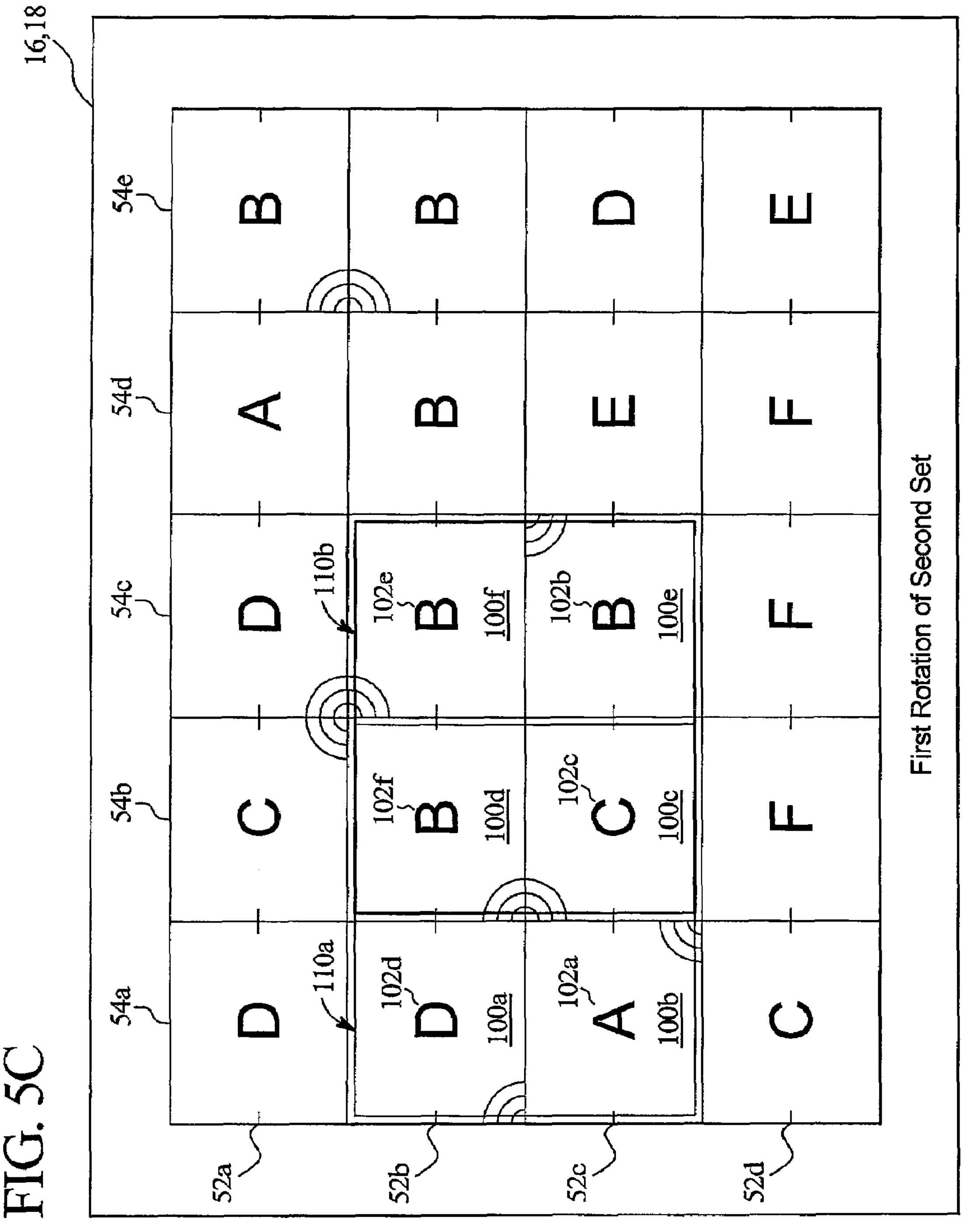

In FIGS. 5B and 5C, the second indicated set of symbols rotate or rearrange to new positions on reels 54*b* and 54*c* to be evaluated by the gaming device for winning combinations. The C symbol 102*c* in fixed position 100*d* moves to fixed position 100*c* on reel 54*b*. It should be appreciated that the C symbol 102*c* moves back to its original position in fixed position 100*c* upon rearrangement of the second set of indicated symbols. In an alternative embodiment, the different sets of indicated symbols rotate in opposite directions or, otherwise, moves in a manner different from the rearrangement of the other set. The B symbol 102*b* in fixed position 100*c* moves to fixed position 100*e* on the adjacent reel 54*c*. It should be appreciated that the B symbol 102*b* has moved across two reels from reel 54*a* to 54*c* after two alternating rearrangements in the illustrated embodiment. It should also be appreciated that, in one embodiment such as one which includes at least two overlapping sets, a symbol is not limited to its original set of indicated symbols. In one embodiment, the symbols rotate within the combined fixed positions of at least two sets of indicated symbols. The final symbol movement for the rearrangement illustrated in FIGS. 5B and 5C includes moving the B symbol 102*e* in fixed position 100*e* to fixed position 100*f* on reel 54*c*, and moving the B symbol 102*f* in fixed position 100*f* to fixed position 100*d* on the adjacent reel 54*b*.

In FIG. 5C, in one embodiment, the second set of symbols 110*b* proceeds through a rearrangement and re-evaluation before the first set of indicated symbols 110*a* proceeds through another rearrangement or rotation. In an alternative embodiment, each symbol in each set of indicated symbols is rearranged and evaluated through the predetermined symbol combinations of the indicated symbols before the rearrangement and symbol combination evaluation occurs for another set. In this embodiment, the gaming device illustrated in FIG. 5C, for example, completes the alternating rearrangement and re-evaluation series or sequence of the first set of symbols 110*a* before rearranging and re-evaluating the second set of indicated symbols 110*b*.

Figure 5D:
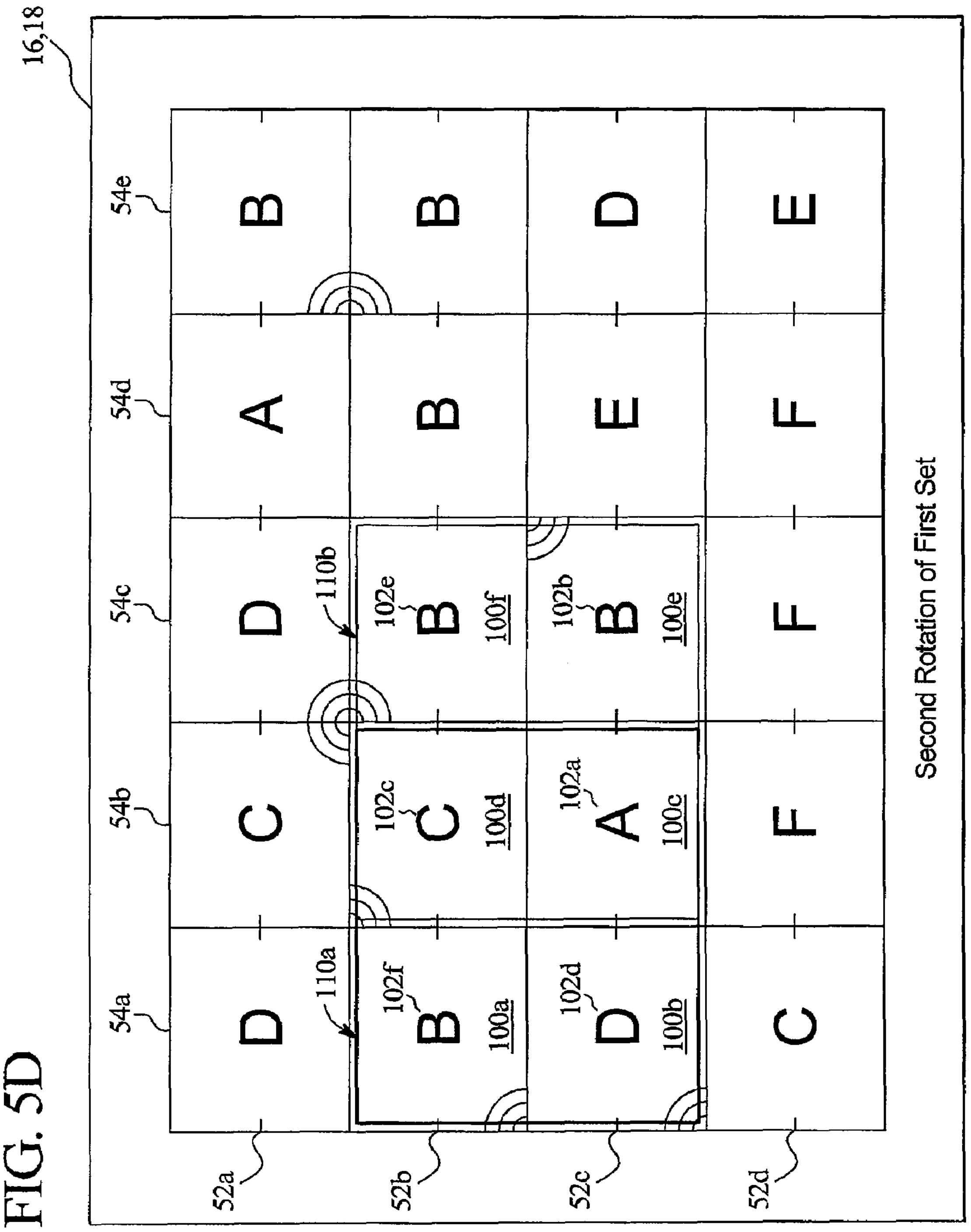

In FIGS. 5C and 5D, the first set of indicated symbols, which now includes symbols from the second set of indicated symbols (the B symbol 102*e*), is rearranged. The D symbol 102*d* in fixed position 100*a* moves to fixed position 100*b* on reel 54*a*. The A symbol 102*a* in fixed position 100*b* moves to fixed position 100*c* on the adjacent reel 54*b*. The C symbol 102*c* in fixed position 100*c* moves to fixed position 100*d* on reel 54*b*. The B symbol 102*f* in fixed position 100*d* moves to fixed position 100*a* on the adjacent reel 54*a*. In FIG. 5D, the first set of indicated symbols 110*a* are re-evaluated by the gaming device based on the new combination of symbols generated by the rearrangement or rotation. Again, no winning combination occurs on the reels.

Figure 5E:
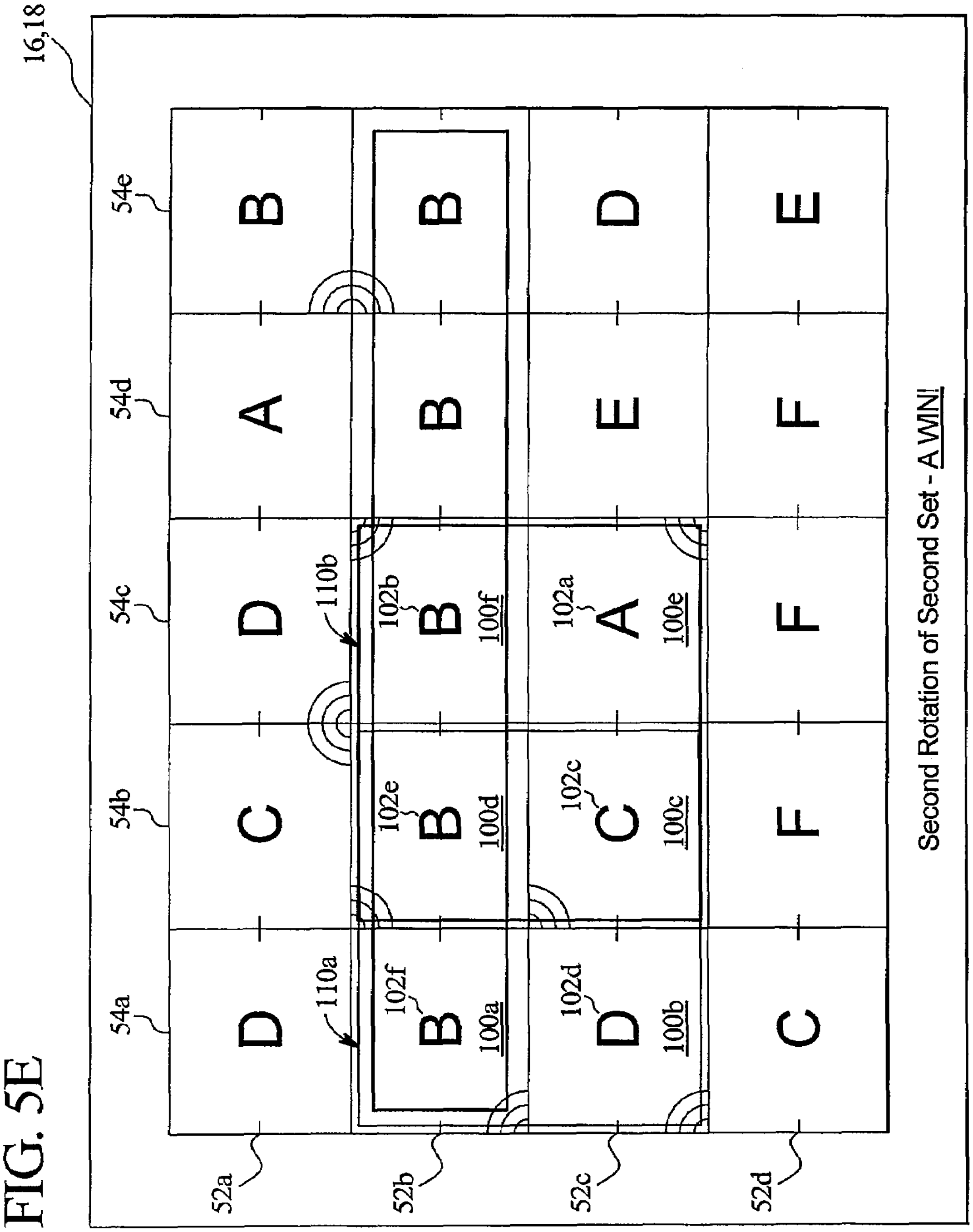

In FIGS. 5D and 5E, the gaming device alternates back to the second set of indicated symbols 110*b* to perform another rearrangement. The C symbol 102*c* in fixed position 100*d* moves to fixed position 100*c* on reel 54*b*. The A symbol 102*a* in fixed position 100*c* moves to fixed position 100*e* on the adjacent reel 54*c*. The B symbol 102*b* in fixed position 100*e* moves to fixed position 100*f* on reel 54*c*. The B symbol 102*e* in fixed position 100*f* moves to fixed position 100*d* on the adjacent reel 54*b*. In FIG. 5E, as a result of the second rotation or rearrangement of the second set of indicated symbols, a winning combination occurs on payline 52*b* for which the player, in one embodiment, is provided an award or outcome. In one embodiment, the sequential or alternating rearrangement of the two indicated sets of symbols continues until the symbols in each set are rearranged to their original positions.

Figure 6A:
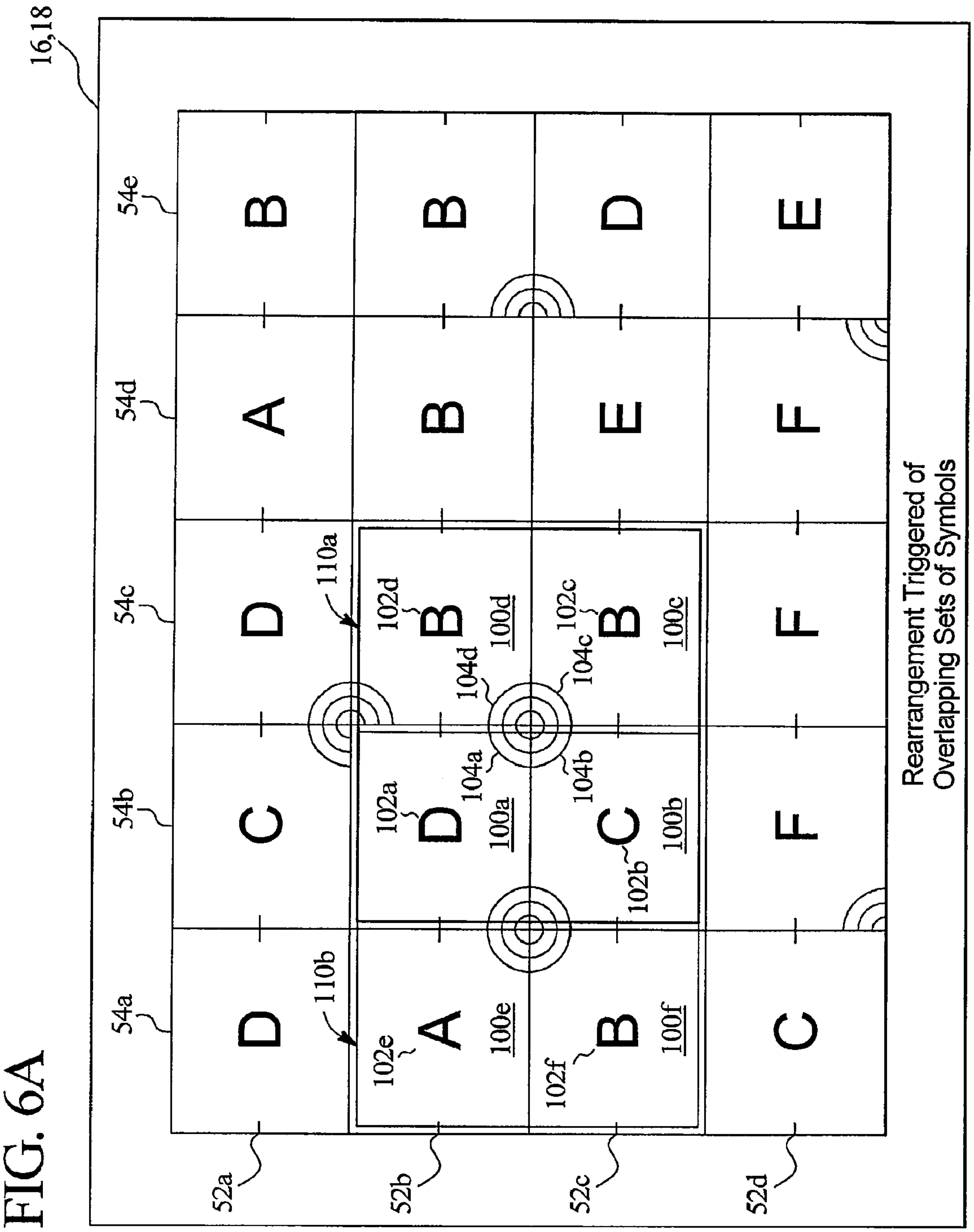
FIGS. 6A, 6B, 6C, 6D and 6E are front perspective views of one embodiment of the present invention illustrating a rearrangement of two overlapping sets of symbols.
Figure 6B:
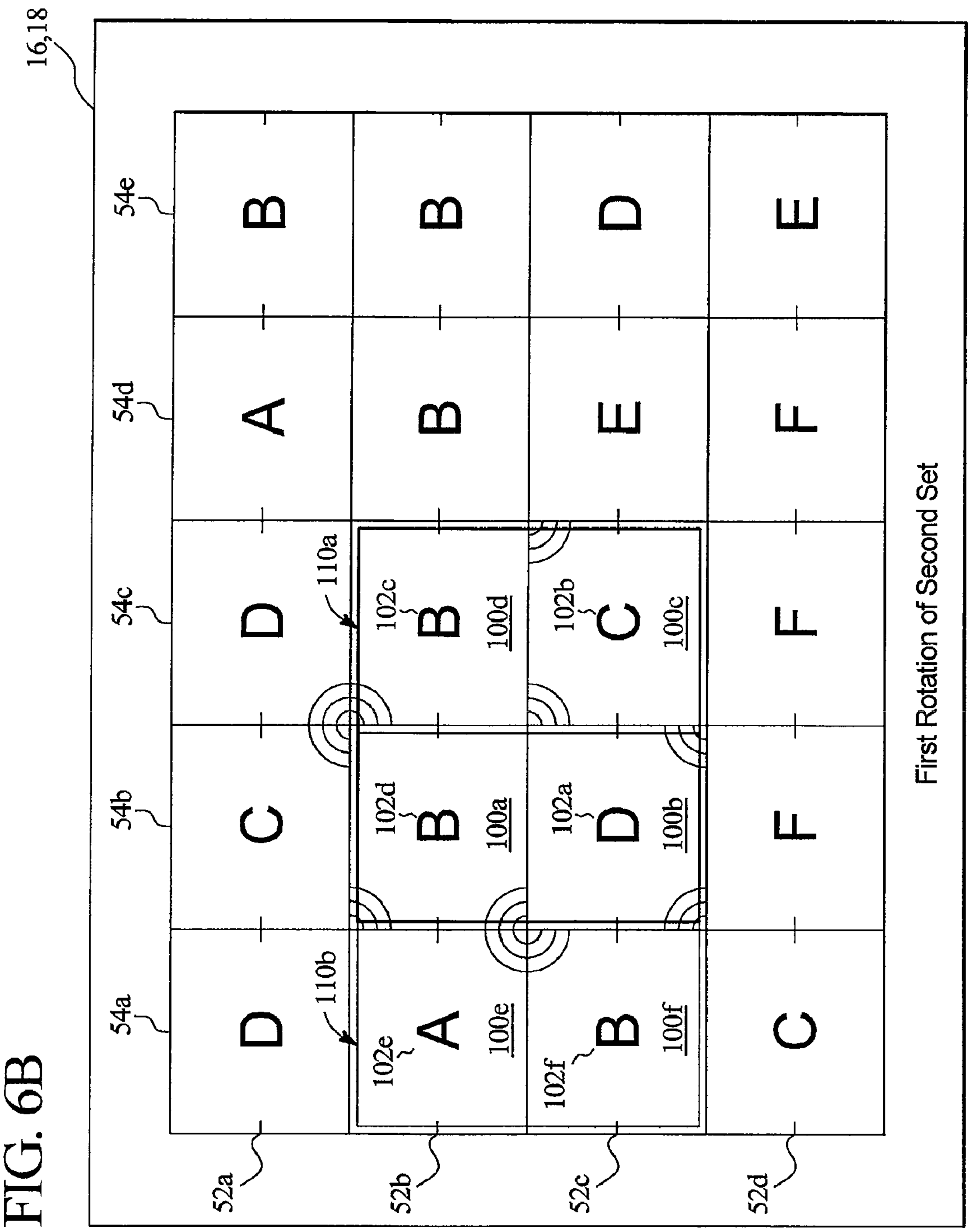

Referring now to FIGS. 6A to 6D, in one embodiment, the order in which two sets of indicated symbols are rotated or rearranged determines whether a player achieves a winning combination on the paylines. FIGS. 6A to 6D illustrate the same displayed symbols in the same fixed positions and the same order of symbols as originally generated in the illustrated display of FIGS. 5A to 5E. In FIGS. 6A to 6D, however, the second set of indicated symbols 110*b* on reels 54*b* and 54*c* are rotated or rearranged first instead of the first set of indicated symbols 110*b* on reels 54*a* and 54*b*. Again, in this embodiment, an evaluation of the symbol combinations is made after each alternating rotation or rearrangement of the set of indicated symbols. In FIGS. 6A and 6B, the D symbol 102*a* in fixed position 100*a* on reel 54*b* moves to fixed position 100*b* on reel 54*b*. The C symbol 102*b* in fixed position 100*b* on reel 54*b* moves to fixed position 100*c* on reel 54*c*. The B symbol 102*c* in fixed position 100*c* on reel 54*c* moves to fixed position 100*d* on reel 54*c*. The B symbol 102*d* in fixed position 100*d* on reel 54*c* moves to fixed position 100*a* on the adjacent reel 54*b*. Upon a completed rearrangement of the symbols 102*a* to 102*d*, the gaming device evaluates the paylines on the reels for the winning symbol combinations.

Figure 6C:
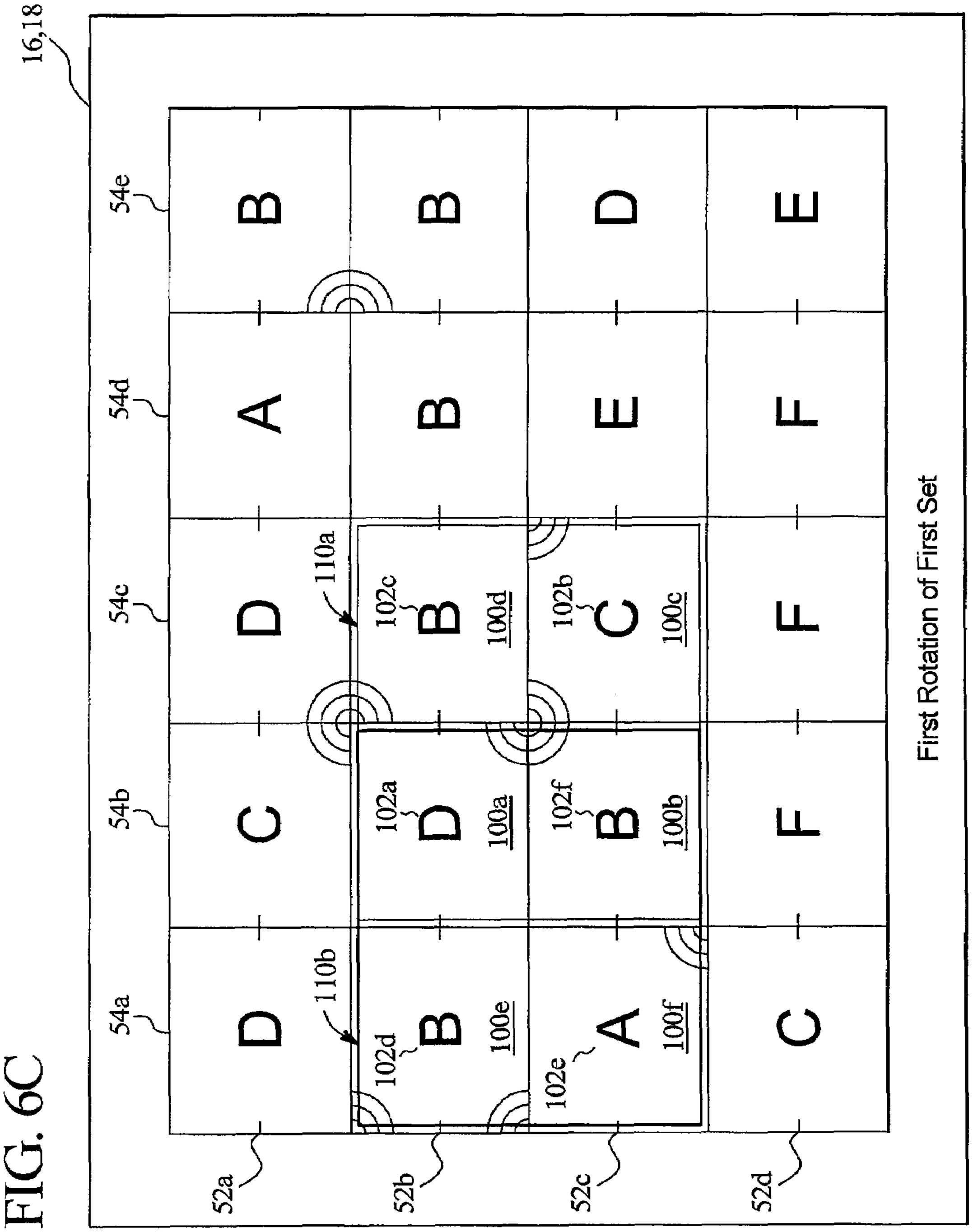
Figure 6D:
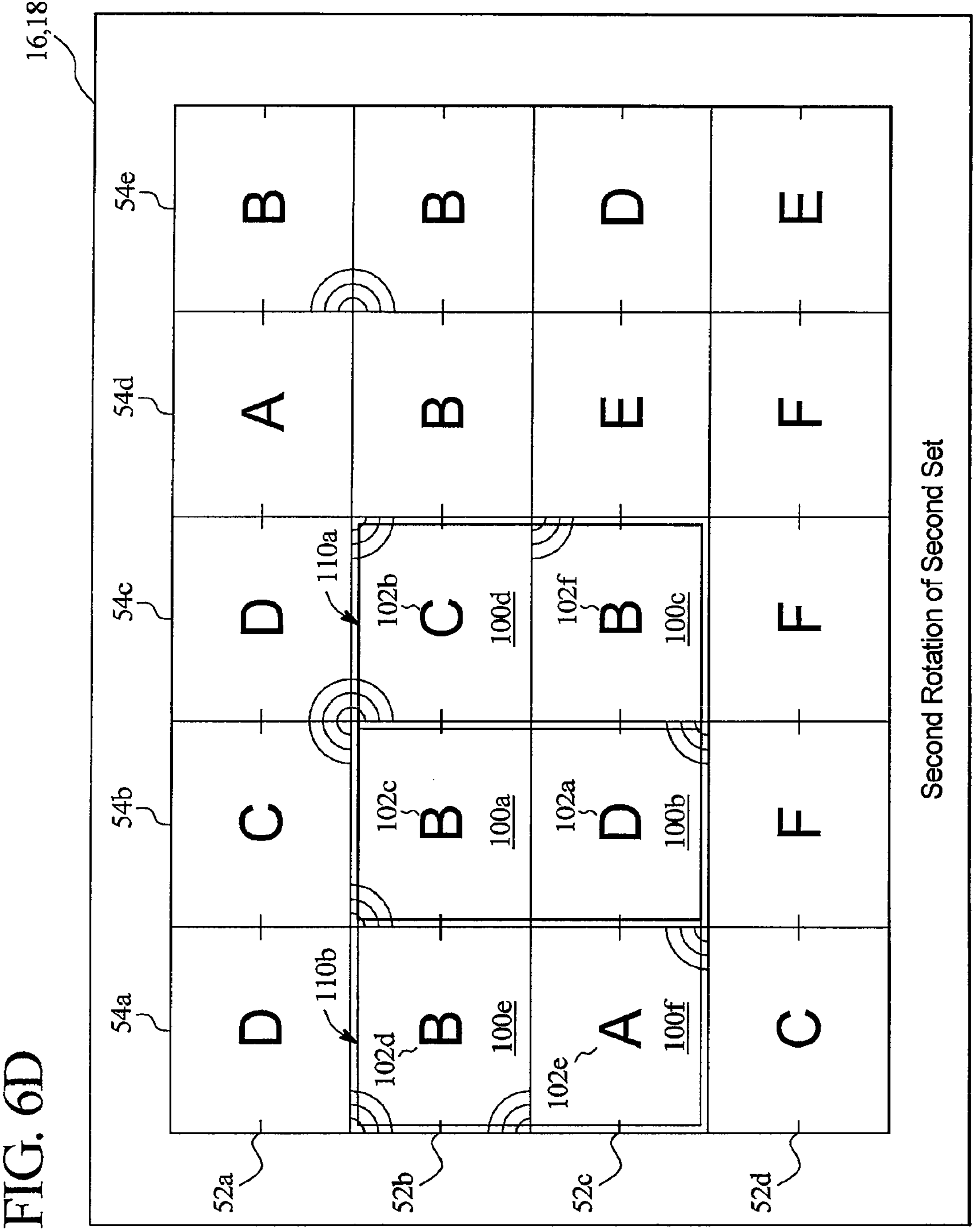
Figure 6E:
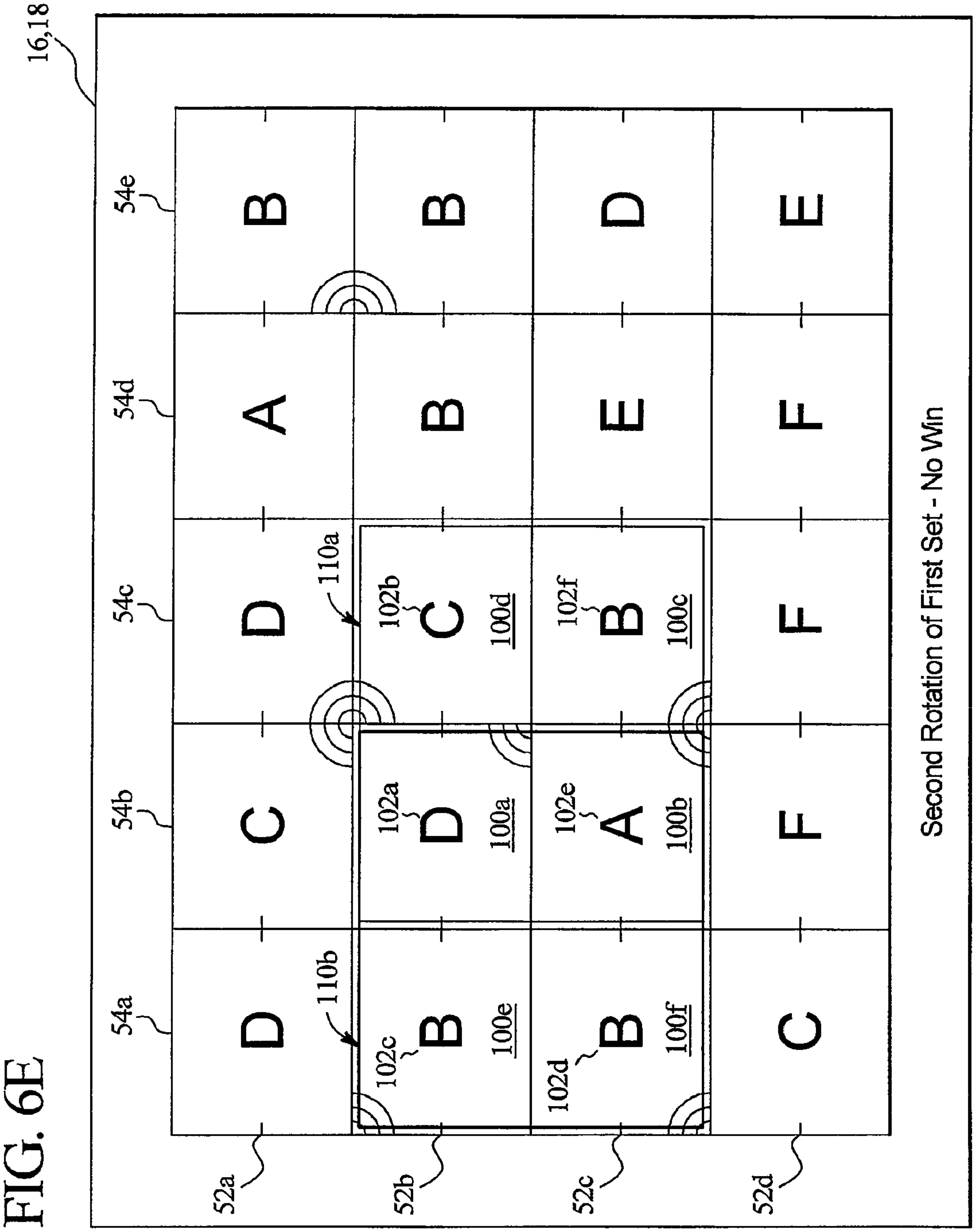

Next, the gaming device rearranges the first set of indicated symbols 110*a*. In FIGS. 6B and 6C, the A symbol 102*e* in fixed position 100*e* on reel 54*a* moves to fixed position 100*f* on reel 54*a*. The B symbol 102*f* in fixed position 100*f* reel 54*a* moves to fixed position 100*b* on the adjacent reel 54*b*. The D symbol 102*a* in fixed position 100*b* on reel 54*b* moves to fixed position 100*a* on reel 54*b*. The B symbol in fixed position 100*a* on reel 54*b* moves to fixed position 100*e* on reel 54*a*. Again, the gaming device makes a determination of whether a winning combination of five symbols exists on the reels and, as illustrated in FIG. 6C, no paylines include a winning combination of symbols. In one embodiment, the gaming device continues to rearrange the sets of indicated symbols in an alternating fashion. In FIGS. 6C and 6D, the D symbol 102*a* in fixed position 100*a* on reel 54*b* moves to fixed position 100*b* on reel 54*b*. The B symbol 102*f* in fixed position 100*b* on reel 54*b* moves to fixed position 100*c* on the adjacent reel 54*c*. The C symbol 102*b* in fixed position 100*c* on reel 54*c* moves to fixed position 100*d* on reel 54*c*. The B symbol 102*c* in fixed position 100*d* on reel 54*c* moves to fixed position 100*a* on the adjacent reel 54*b*. In FIG. 6D, the gaming device makes another determination of whether a winning combination of five symbols on a payline exists, and, upon the completion of another rearrangement of the symbols, no winning combinations exist on any of the paylines. In FIGS. 6D and 6E, the B symbol 102*d* in fixed position 100*e* on reel 54*a* moves to fixed position 100*f* on reel 54*a*. The A symbol 102*e* in fixed position 100*f* on reel 54*a* moves to fixed position 100*b* on the adjacent reel 54*b*. The D symbol 102*a* in fixed position 100*b* on reel 54*b* moves to fixed position 100*a* on reel 54*b*. The B symbol 102*c* in fixed position 100*a* on reel 54*b* moves to fixed position 100*e* on the adjacent reel 54*a*. In FIG. 6E, the gaming device once again makes a determination that no winning combination of five symbols occurs on a payline.

In comparison to the embodiment illustrated in FIGS. 5A to 5E, at this point, after four alternating rearrangements of the indicated symbols of the two sets, the gaming device had generated a winning combination illustrated in FIG. 5E. It should, therefore, be appreciated that the order in which alternating rearrangements of two overlapping sets of indicated symbols are performed may result in different outcomes. In an embodiment where the rearrangement of the indicated symbols continues until the symbols return to their original fixed positions, as illustrated in FIG. 6A, and where no winning combination of symbols is produced on the paylines, the player will not receive an award on this spin of the reels.

In an alternative embodiment, the present invention is adapted to be played in games without reels. Instead of spinning the reels, each symbol display area or position on which a symbol is displayed is rearranged in relation to the other symbol display positions to establish a first position of the symbol display positions. If swapping indicators associated with the symbols form a predetermined configuration, the indicated symbols are rearranged to different symbol display positions whereupon the gaming device re-evaluates the combination of symbols.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising: at least one input device; at least one display device; at least one processor; and at least one memory device storing a plurality of instructions, which when executed by the at least one processor, cause the at least one processor to operate with the at least one input device and the at least one display device to:

(a) generate and display a plurality of symbols, each of said plurality of symbols being displayed at a separate one of a plurality of positions;

(b) determine if any winning symbol combinations are displayed at the positions;

(c) for each displayed winning symbol combination, display an award associated with said winning symbol combination;

(d) determine if a first triggering event has occurred which causes one or more of a first set of the displayed symbols to be rearranged and a second triggering event has occurred which causes one or more or a different second set of the displayed symbols to be rearranged, wherein the first triggering event is a display of a first plurality of swapping indicators in a first predetermined configuration in association with the first set of the displayed symbols and the second triggering event is a display of a second plurality of swapping indicators in a second predetermined configuration in association with the second set of the displayed symbols;

(e) if the first set is to be rearranged triggering event has occurred:

(i) automatically rearrange each of the symbols of the first set in a manner dictated by the first predetermined configuration of the swapping indicators, wherein the rearrangement includes moving each of the symbols in the first set to a different one of the positions of another of the symbols in the first set, and (ii) after rearranging the symbols of the first set, determine if any winning symbol combinations are displayed at the positions;

(f) if the second triggering event has occurred:

(i) automatically rearrange each of the symbols of the second set in a manner dictated by the second predetermined configuration of the swapping indicators, wherein the rearrangement includes moving each of the symbols in the second set to a different one of the positions of another of the symbols in the second set, and (ii) after rearranging the symbols of the second set, determine if any winning symbol combinations are displayed at the positions; and (g) display a total award including any awards associated with winning symbol combinations resulting from the rearrangement of the first set and the second set.

2. The gaming system of claim 1, wherein the plurality of instructions, when executed by the at least one processor, cause the at least one processor to operate with the at least one display device to rearrange the first set before the second set.

3. The gaming system of claim 1, wherein the first set and the second set include at least one common position.

4. The gaming system of claim 3, wherein the plurality of instructions, when executed by the at least one processor, cause the at least one processor to operate with the at least one display device to rearrange the first set prior to rearranging the second set.

5. The gaming system of claim 1, wherein the plurality of instructions, when executed by the at least one processor, cause the at least one processor to operate with the at least one display device to rearrange the first set in a different rearrangement pattern than the second set.

6. The gaming system of claim 1, wherein the plurality of instructions, when executed by the at least one processor, cause the at least one processor to operate with the at least one display device to rearrange the first set using the same rearrangement pattern as that used to rearrange the second set.

7. The gaming system of claim 1, wherein the plurality of instructions, when executed by the at least one processor, cause the at least one processor to operate with the at least one display device to display any award associated with the rearrangement of the first set after the rearrangement of the first set and before the rearrangement of the second set.

8. The gaming system of claim 1, wherein the plurality of instructions, when executed by the at least one processor, cause the at least one processor to operate with the at least one display device to rearrange a plurality of sets of the symbols.

9. The gaming system of claim 1, wherein each set of indicated symbols includes a predetermined number of indicated symbols.

10. The gaming system of claim 1, wherein the plurality of instructions, when executed by the at least one processor, cause the at least one processor to determine whether to rearrange at least one the first set of the symbols and the second set of the symbols based on whether any winning symbol combination is associated with a combination of the displayed symbols.

11. The gaming system of claim 1, wherein the plurality of instructions, when executed by the at least one processor, cause the at least one processor to operate with the at least one input device and the at least one display device to enable a player to determine whether to rearrange at least one set of indicated symbols based on whether any winning symbol combination is associated with a combination of the displayed symbols.

12. The gaming system of claim 1, wherein the plurality of instructions, when executed by the at least one processor, cause the at least one processor to operate with the at least one display device to rearrange the first set at least two times and determine any winning combination of the displayed symbols for each rearrangement until the indicated symbols are rearranged to their original positions before rearranging the second set.

13. The gaming system of claim 1, wherein the first set is adjacent to the second set.

14. The gaming system of claim 1, wherein the first set and the second set include a plurality of common positions.

15. The gaming system of claim 1, wherein the plurality of instructions, when executed by the at least one processor, cause the at least one processor to operate with the at least one input device and the at least one display device to rearrange at least one of the first set and the second set in one of: (a) a counter-clockwise direction and (b) a clockwise direction.

16. The gaming system of claim 1, wherein the plurality of instructions, when executed by the at least one processor, cause the at least one processor to operate with the at least one input device and the at least one display device to rearrange the symbols in the first set and the second set in an alternating fashion.

17. The gaming system of claim 1, wherein the plurality of instructions, when executed by the at least one processor, cause the at least one processor to operate with the at least one display device to automatically rearrange each of the symbols of one or more of the first set and the second set at least two times, and for each of the at least two rearrangements, determine if any winning symbol combinations are displayed at the positions.

18. A method of operating a gaming system, the method comprising:

(a) generating and displaying a plurality of symbols on at least one display device, each of said plurality of symbols being displayed at a separate one of a plurality of positions;

(b) determining if any winning symbol combinations are displayed at the positions using at least one processor;

(c) for each displayed winning symbol combination, displaying an award associated with said winning symbol combination on said at least one display device;

(d) determining if a first triggering event has occurred using said at least one processor which causes one or more of a first set of the displayed symbols to be rearranged and a second triggering event has occurred using said at least one processor which causes a different second set of the displayed symbols to be rearranged, wherein the first triggering event is a display of a first plurality of swapping indicators on said at least one display device in a first predetermined configuration in association with the first set of the displayed symbols and the second triggering event is a display of a second plurality of swapping indicators on said at least one display device in a second predetermined configuration in association with the second set of the displayed symbols;

(e) if the first triggering event has occurred:

(i) automatically rearranging each of the symbols of the first set in a manner dictated by the first predetermined configuration of the swapping indicators, wherein the rearrangement includes moving each of the symbols in the first set to a different one of the positions of another of the symbols in the first set, and (ii) after rearranging the symbols of the first set, determining if any winning symbol combinations are displayed at the positions;

(f) if the second triggering event has occurred:

(i) automatically rearranging each of the symbols of the second set in a manner dictated by the second predetermined configuration of the swapping indicators, wherein the rearrangement includes moving each of the symbols in the second set to a different one of the positions of another of the symbols in the second set, and (ii) after rearranging the symbols of the second set, determining if any winning symbol combinations are displayed at the positions using said at least one processor; and (g) displaying a total award on said at least one display device including any awards associated with winning symbol combinations resulting from the rearrangement of the first set and the second set.

19. The method of claim 18, which includes rearranging the first set before the second set.

20. The method of claim 18, wherein the first set and the second set include at least one common position.

21. The method of claim 20, which includes rearranging the first set prior to rearranging the second set.

22. The method of claim 18, which includes rearranging the first set in a different rearrangement pattern than the second set.

23. The method of claim 18, which includes rearranging the first set according to a same rearrangement pattern as the second set.

24. The method of claim 18, which includes rearranging a plurality of sets of the symbols.

25. The method of claim 18, wherein each set of indicated symbols includes a predetermined number of indicated symbols.

26. The method of claim 18, which includes determining whether to arrange at least one set of indicated symbols based on whether any winning symbol combination is associated with a combination of displayed symbols.

27. The method of claim 18, which includes enabling a player to determine whether to arrange at least one set of indicated symbols based on whether any winning symbol combination is associated with a combination of displayed symbols.

28. The method of claim 18, which includes determining any winning combination of displayed symbols after each of the first and second sets are rearranged.

29. The method of claim 18, which includes rearranging the first set at least two times and determining any winning combination of the displayed symbols for each rearrangement until the indicated symbols are rearranged to their original positions before rearranging the second set.

30. The method of claim 18, wherein the first set is adjacent to the second set.

31. The method of claim 18, wherein the first set and the second set include a plurality of common symbols.

32. The method of claim 18, which includes rearranging at least one of the first set and the second set in one of: (a) a counter-clockwise direction and (b) a clockwise direction.

33. The method of claim 18, which includes rearranging the symbols in the first set and the second set in an alternating fashion.

34. The method of claim 18, which includes automatically rearranging each of the symbols of one or more of the first set and the second set at least two times, and for each of the at least two rearrangements, determining if any winning symbol combinations are displayed at the positions.

35. The method of claim 18, which is provided through a data network.

36. The method of claim 35, wherein the data network is an internet.

* * * * *

UNITED STATES PATENT AND TRADEMARK OFFICE

CERTIFICATE OF CORRECTION

PATENT NO. : 7,578,737 B2
APPLICATION NO. : 12/118349
DATED : August 25, 2009
INVENTOR(S) : Cregan et al.

It is certified that error appears in the above-identified patent and that said Letters Patent is hereby corrected as shown below:

IN THE CLAIMS:

In Claim 1, Column 18, line 3, delete “set is to be rearranged”.

Signed and Sealed this

Sixth Day of July, 2010

David J. Kappos
*Director of the United States Patent and Trademark Office*